(12) United States Patent
McIntyre et al.

(10) Patent No.: US 6,753,623 B2
(45) Date of Patent: Jun. 22, 2004

(54) SWITCHED CAPACITOR ARRAY CIRCUITS HAVING UNIVERSAL REST STATE AND METHOD

(75) Inventors: William James McIntyre, Wheatland, CA (US); Jeffrey P. Kotowski, Nevada City, CA (US); Stephane Guenot, Grass Valley, CA (US)

(73) Assignee: National Semiconductor Corporation, Santa Clara, CA (US)

(*) Notice: Subject to any disclaimer, the term of this patent is extended or adjusted under 35 U.S.C. 154(b) by 130 days.

(21) Appl. No.: 09/730,104

(22) Filed: Dec. 5, 2000

(65) Prior Publication Data
US 2002/0109415 A1 Aug. 15, 2002

(51) Int. Cl.[7] ............................................. H02M 3/06
(52) U.S. Cl. ............................ 307/109; 307/110; 363/59
(58) Field of Search ................................ 307/109, 110; 363/59

(56) References Cited

U.S. PATENT DOCUMENTS

| | | | |
|---|---|---|---|
| 5,111,375 A | 5/1992 | Marshall | 363/60 |
| 5,132,895 A | 7/1992 | Kase | 363/60 |
| 5,185,721 A | 2/1993 | Love et al. | 365/189.06 |
| 5,532,916 A | 7/1996 | Tamagawa | 363/62 |
| 6,021,056 A | 2/2000 | Forbes et al. | 363/60 |
| 6,198,645 B1 * | 3/2001 | Kotowski et al. | 363/59 |
| 6,226,193 B1 | 5/2001 | Bayer et al. | 363/59 |
| 6,504,422 B1 | 1/2003 | Rader et al. | 327/536 |

* cited by examiner

Primary Examiner—Brian Sircus
Assistant Examiner—Robert L. Deberadinis
(74) Attorney, Agent, or Firm—Girard & Equitz LLP

(57) ABSTRACT

A switched capacitor array circuit for use in a voltage regulator, including L, M and N banks of capacitor positions disposed intermediate an input node and a ground node, between the input and output nodes and between the output node and the ground node, respectively. Switching circuitry operates to switch three capacitors between a common phase configuration and a gain phase configuration. Two of the capacitors are disposed in one of the L, M and N banks of capacitor positions, with the third capacitor being disposed in a different one of the L, M and N banks of capacitor positions in the common phase configuration. When switched from the common phase to the gain phase configuration, at least one of the three capacitors is moved to a different capacitor position.

98 Claims, 9 Drawing Sheets

SWITCHED CAPACITOR ARRAY CIRCUITS HAVING UNIVERSAL REST STATE AND METHOD

BACKGROUND OF THE INVENTION

1. Field of the Invention

The present invention relates generally to power converter circuits and, in particular, to switched capacitor array circuits used in DC—DC converters.

2. Description of Related Art

Switched capacitor circuitry is used in several power converter applications and is particularly advantageous where the use of inductors is to be avoided. In a typical application, switched capacitor circuitry is used to convert a D.C. input voltage to one or more D.C. output voltages which may differ in magnitude and polarity from the input voltage. In some instances the circuitry includes some form of voltage regulation for controlling the magnitude of the output voltage notwithstanding changes in magnitude of the input voltage and changes in the load driven by the circuitry.

FIGS. 1A, 1B, 1C and 1D depict various states of a conventional capacitor array of the type which can be used in an integrated circuit voltage regulator, such as the conventional DC—DC voltage converter shown in FIG. 3. The converter includes a capacitor array circuit 10 comprised of three discrete capacitors A, B and C and several transistor switches which switch the capacitors into various configurations, such as those shown in FIGS. 1A, 1B, 1C and 1D.

As is well known, the capacitor array is switched between two states or phases so that the capacitors will be charged on one of the phases by a power source and so that the charge is transferred to a load in another of the phases. In some configurations, the power source operates to charge the array and the charge is transferred to the load in one or both of the two phases.

FIG. 1A is referred to as the common phase configuration of the capacitor array comprising capacitors A, B, C and the associated transistor switches (not depicted). FIGS. 1B, 1C and 1D are referred to as first, second and third gain phase configurations of the capacitor array. In operation, switch control circuitry 12 (FIG. 3) cause the array 10 to periodically switch between the common phase configuration (FIG. 1A) and one of the three gain phase configurations (FIGS. 1B, 1C and 1D). Thus, charge is periodically transferred from a power source (Vin) to a load connected to output Vsc.

The ratio Gsc of the output voltage Vsc of the capacitor array to the input voltage Vin is the gain state value of the array and is expressed as follows:

$$Gsc = Vsc/Vin \quad (1)$$

Gsc is based upon the output voltage Vsc when no load is connected to the array output other than a holding capacitor H. When a load is connected, voltage Vsc is reduced to the output voltage Vout, with the difference between Vout and Vsc being a function of, among other things, the net current delivered to the load.

Assuming that the gain phase configuration of the capacitor array is FIG. 1B, the value of Gsc can be determined by inspection. During the common phase configuration (FIG. 1A) the voltages across the three capacitors, $V_A$, $V_B$ and $V_C$ are all equal to Vsc as follows:

$$V_A = V_B = V_C = Vsc \quad (2)$$

Note that the "+" sign on the capacitors identifies the capacitor terminal and not necessarily the polarity of the voltage across the capacitor. The input voltage Vin is, by inspection, as follows:

$$Vin = Vsc + (V_A + V_B + V_C) \quad (3)$$

By combining equations (2) and (3), Vin=4Vsc so that Gsc is as follows:

$$Gsc = Vsc/Vin = \tfrac{1}{4} \quad (4)$$

Assuming that the FIG. 1C gain phase configuration is used, the input voltage Vin is, by inspection, as follows:

$$Vin = Vsc + (V_A + V_B) \quad (5)$$

By combining equations (2) and (5), Vin=3Vsc so that Gsc is as follows:

$$Gsc = Vsc/Vin = \tfrac{1}{3} \quad (6)$$

A similar analysis will confirm that the third gain phase configuration shown in FIG. 1D will produce a gain Gsc=½. Thus, all of the gains for the FIGS. 1A–1D array produce an output Vsc which is smaller than the input Vin.

Referring to FIG. 3, the converter utilizes a switched capacitor array 10, such as the array of FIGS. 1A–1D. The switch control circuitry 12 operates to control the state of the various transistor switches that are present in array 10 so that the array can assume any one of the configurations depicted in FIGS. 1A–1D. Gain setting circuitry 14 operates to control the switch control circuitry 12 so that the array will switch between the common phase configuration of FIG. 1A and a selected one of the gain phase configurations 1B–1D so as to provide three gain state values, with Gsc=½, ⅓ and ¼.

A clock circuit 20 provides a clock signal used by the switch control circuitry 12 to switch the transistor switches in array 10 with non-overlapping clock signals. One phase of the clock signal operates to turn off selected ones of the transistor switches and the second phase operates to turn on selected ones of the switches. The frequency F at which the switched capacitor array 10 switches between the common and the gain phase configurations will determine the effective output impedance Zout of the array as follows:

$$Zout \propto 1/(FC) \quad (7)$$

where C is the capacitance of the capacitors A, B and C. Thus, the output voltage Vout can be controlled by varying the value of the switching frequency F which will vary the voltage drop across Zout.

Regulation can be maintained only if a minimum gain state is maintained as will be explained.

Array 10 is capable of assuming different gain state values Gsc to increase the efficiency of the converter. The efficiency Eff of the converter can be generally expressed as follows:

$$Eff = Vout/(Gsc * Vin) \quad (8)$$

Thus, it can be seen that efficiency can be increased by using the smallest gain state value Gsc available, provided a minimum gain requirement is met. The gain state value Gsc must be at least large enough to ensure that the product of Gsc and Vin is larger than the desired output voltage. If this minimum gain requirement is not met, regulation of a voltage converter using the array cannot be carried out, as will be explained below in connection with equation (9).

The gain setting circuitry 14 of the FIG. 3 converter causes array 10 to change from one gain state value Gsc to another. The switch driver circuitry permits changes in gain state value to be made only when the array is in the common phase configuration. Thus, for example, when Gsc changes from ⅓ to ½, the switch over occurs when the array is in the common phase configuration of FIG. 1A rather than going directly from the gain phase configuration of FIG. 1C (Gsc=⅓) to the gain phase configuration of FIG. 1D (Gsc=½).

Referring back to FIG. 3, a voltage reference circuit 26 produces reference voltage Vod indicative of the desired regulated output voltage Vout of the converter circuit. This value Vod is compared by a comparator circuit 24 with the actual output voltage Vout. The comparator output, sometimes referred to as signal Skip, has an average value inversely proportional to the load current provided by the converter circuit. Signal Skip is used to clock an up/down counter 16 which controls the gain setting circuitry 14. The up/down counter 16 has three output states that set the gain of the switched capacitor array 10 to one of the 3 gain state values (Gsc=½, ⅓ or ¼).

The output of the comparator circuit 24 is also used to control the state of logic circuitry represented by AND gate 18. As will be explained, gate 18 operates to either transfer or momentarily block the non-overlapping clock signals to the switch control circuitry 12 thereby controlling the amplitude of Vout by varying the value of Zout in accordance with equation (7). The switched capacitor array 10 must be in a gain state value Gsc which will be sufficiently large to permit voltage regulation. This is referred to as the minimum gain state value. An analog-to-digital converter (ADC) circuit 28 monitors the input Vin and output Vout and controls the gain setting circuitry 14 so that the switched capacitor array 10 will be at the minimum gain state value Gsc according to equation (9) below, with Gconv being the overall gain of the converter with regulation.

$$Gsc \geq Vout/Vin = Gconv \qquad (9)$$

Thus, if the input voltage Vin was nominally +8 volts and the output voltage Vout is +2.4 volts, Gconv is 0.3 (2.4/8). Thus, ADC circuit 28 will prevent the gain setting circuitry 14 from providing a gain state value Gsc less than 0.3 under these circumstances since any lower value of Gsc will prevent the converter from regulating properly, even for small load currents.

Since the switched capacitor array provides only three discrete values of Gsc, the gain setting circuitry will set the minimum gain Gsc to ⅓ (0.33). Note also that if Gsc were exactly equal to Gconv, the converter would have essentially no output current capability so that it is likely that a higher gain state would be selected as will be explained.

The converter of FIG. 3 contains two control loops including a first loop which includes gate 18 and a second loop which includes gain setting circuitry 14. Assuming that the switched capacitor array 10 has sufficient gain Gsc in accordance with equation (9), changes in output voltage Vout will generally be attributable to changes in the load current or input Vin. As previously noted, the output of the comparator circuit 24, signal Skip, has an average value which is inversely proportional to the load current. If the load current should increase, output Vout will drop below Vod in which case the Skip output of comparator circuit 24 will go low thereby enabling gate 18 by way of inverter 22. Thus, the capacitor array 10 will be clocked, a process sometimes referred to as pumping, thereby increasing the output Vout.

If the actual output Vout exceeds the desired output Vod due to a drop in load current, the high Skip output of comparator circuit 24 will cause inverter 22 to disable gate 18 thereby inhibiting further pumping of the array 10. This will cause the output voltage Vout to drop (assuming there is some minimum load or leakage current). Once the output has dropped sufficiently, comparator circuit 24 will enable gate 18 so that pumping can resume. Thus, the first loop carries out a form of pulse frequency modulation (PFM) to control the output Vout in the presence of a change in load current for a particular gain state value Gsc for a given value of Vin. As will be explained below, the gain state value Gsc is set by the second loop.

ADC circuit 28, among other things, operates to assure that the array 10 provides the minimum gain Gsc necessary for regulation in accordance with equation (9). The second loop allows the gain Gsc to increase above the minimum gain based upon the load requirements. As previously noted, signal Skip has an average value inversely proportional to the load current. Thus, the second loop utilizes signal Skip to determine gain Gsc. If signal Skip is high for more than a first predetermined number of clock cycles, K=3 for example, the up/down counter 16 is decremented once thereby decreasing the gain state Gsc of array 10 by one step, provided the value of Gsc does not go below the minimum gain requirement. Alternatively, if signal Skip is low for more than a predetermined number of clock cycles, M=4 for example, the gain state value Gsc will be increased by one step.

Assuming in the previous example that the input Vin is +8 volts and the desired output Vod is +2.4 volts, the selected gain state Gsc is ½ and the actual output Vout is +2.55 volts. Under these conditions, it is possible to maintain Gsc at ½ and reduce the output Vout exclusively by way of the first loop by using pulse frequency modulation (PFM). However, in order to increase the efficiency, the up/down counter 16 is implemented so that it will be decremented one step after M=3 number of skipped pulses. This will cause the gain setting circuitry 14 to reduce the gain state value Gsc from ½ to ⅓. This will increase the converter efficiency as can be seen from equation (8).

The switched capacitor array of FIGS. 1A–1D provides gains Gsc that are less than one. Such arrays are limited to buck converters where the input voltage exceeds the desired output voltage. Boost converters produce an output voltage greater than the input voltage and thus require switched capacitor array providing gain state values Gsc greater than one.

FIGS. 2A–2G show a further prior art switched capacitor array which is capable of supporting both buck and boost converters. FIG. 2A is the common phase configuration where capacitors A, B and C are connected in parallel between input Vin and output Vsc. Thus, the FIG. 2A common phase configuration differs from that of FIG. 1A. FIGS. 2B through 2D are the gain phase configurations which provide gains Gsc of ¾, ⅔ and ½, respectively. By way of example, it can be seen from FIG. 2A that the voltages across capacitors A, B, and C are the same and the input voltage Vin is as follows:

$$Vsc = Vin + V_A \text{ (or } +V_B \text{ or } +V_C) \qquad (10)$$

By inspection of FIG. 2B, it can be seen that the output voltage Vsc can also be expressed as follows:

$$Vsc = -(V_A + V_B + V_C) = -3V_A \qquad (11)$$

Combining equations (10) and (11), Vsc is as follows:

$$Vsc = Vin - Vsc/3 \qquad (12)$$

Thus, the gain state value Gsc for FIG. 2B is:

$$Gsc = Vsc/Vin = \text{¾} \qquad (13)$$

FIGS. 2E, 2F and 2G are the boost configurations. One or more of the capacitors A, B and C is connected in series between the input Vin and ground rather than between the output Vout and ground for the buck configurations previously described. Note also that the polarity of the capacitors is reversed. Referring to FIG. 2E in particular, it can be seen by inspection that the input voltage Vin is as follows:

$$Vin = V_A + V_B + V_C = 3V_A \quad (14)$$

Combining equations (10) and (14) produces the following:

$$Vsc = Vin + Vin/3 \quad (15)$$

Thus, from equation (15), it can be seen that FIG. 2E produces a Gsc=Vsc/Vin=4/3. A similar analysis shows that FIGS. 2F and 2G provide Gsc=3/2 and 2, respectively.

The switched capacitor array of FIGS. 2A–2G can be used as array 10 of the FIG. 3 so that the converter has both buck and boost capabilities. Thus, for example, the converter would be capable of providing and output Vsc of +2.4 volts over a wide range of input voltages Vin, including voltages greater than +2.4 volts and less than +2.4 volts.

It can be seen from equation (8) that in order to increase efficiency, the value of Gsc should be not be any greater than necessary to provide the necessary load current at the desired output voltage. As previously described in connection with the FIG. 3 converter, should the value of Gsc be greater than necessary, this condition will be identified by signal Skip produced at the output of gate 18 being high for more than a predetermined number K clock cycles. However, since there are a limited number of discrete gain state values Gsc available, there will always be an inherent degree of inefficiency. The array of FIGS. 2A–2G produce six different gain values over a wide range, but efficiency can be increased by additional gain values or gain values that are more closely spaced over a smaller range.

As previously noted, it is highly preferred to have a common phase configuration, such a the phase configuration represented by FIG. 2A, associated with a group of gain phase configurations, such as the six gain phase configurations associated with FIGS. 2B–2G. It is not feasible to utilize gain phase configurations, such as shown in FIGS. 1B–1D, with the common phase configuration represented by FIG. 2A. Assume, for example, that an array 10 is configured to be switched between the configurations of FIGS. 1A/1D to provide a Gsc of ½ and then switched between the configurations of FIGS. 2A/2C to provide a Gsc of ⅔. The voltage across capacitor A will be −Vsc/2 per FIGS. 2A/2C and will be +Vsc per FIGS. 1A/1D. Since these voltages are not the same, the output of the array will assume some voltage which is inconsistant with Gsc=½ and Gsc=⅔ and will, at minimum, reduce efficiency and will, at worst case, prevent regulation from taking place.

There is a need for switched capacitor array capable of providing an increased number of gain phase configurations which have a common phase configuration. The present invention addresses this shortcoming of the prior art and is capable of providing switched capacitor arrays having a common phase configuration and a large number of compatible gain phase configurations. This and other advantages of the present invention will become apparent to those skilled in the art upon a reading of the following Detailed Description of the Invention together with the drawings.

SUMMARY OF THE INVENTION

A switched capacitor array circuit coupled between an input node and an output node and capable of providing multiple gain state values is disclosed. The array circuit includes an L bank of capacitor positions disposed intermediate the input node and a third node, typically circuit common, with the L bank capacitor bank positions consisting of series capacitor positions and parallel capacitor positions. An M bank of capacitor positions is included which is disposed intermediate the input node and the output node, with the M bank capacitor bank positions also consisting of series capacitor positions and parallel capacitor positions. Further, an N bank of capacitor positions is provided which is disposed intermediate the output node and the third node, with the N bank capacitor bank positions consisting of series capacitor positions and parallel capacitor positions.

One embodiment of the invention includes first, second and third capacitors together with switching circuitry coupled to the capacitors and to the input node, the output node and the third node. Also included is control circuitry coupled to the switching circuitry and configured to switch the switched capacitor array circuit between a common phase configuration and a gain phase configuration so as to provide a gain state value Gsc. In the gain phase configuration, the first and second capacitors are disposed in one of the L, M and N bank of capacitor positions. The third capacitor is disposed in a different one of the L, M and N bank of capacitor positions in the common phase configuration. When switching from the common phase configuration to the gain phase configuration, at least one of the first, second and third capacitors is moved from a common phase configuration position to a gain position different than the common phase configuration position. The capacitors that are disposed in the series capacitor position in the common phase configuration are disposed in the parallel capacitor position in the gain phase configuration and the capacitors that are disposed in the parallel capacitor position in the common phase configuration are disposed in the series capacitor position in the gain phase configuration.

DETAILED DESCRIPTION OF THE INVENTION

Figure 4:
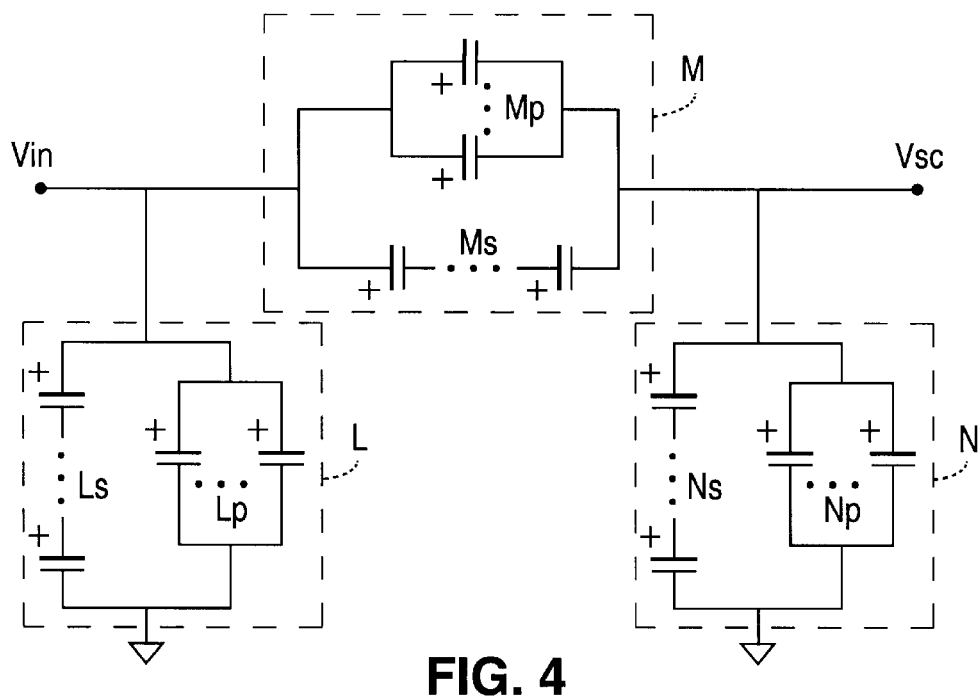
FIG. 4 is a diagram of a generalized common phase configuration of a switched capacitor array circuit in accordance with the present invention, showing the three banks of capacitor positions L, M and N including the series and parallel component positions for each bank.

Referring again to the drawings, FIG. 4 is a generalized diagram of a common phase configuration for a switched capacitor array circuit in accordance with the present invention. The common phase configuration is compatible with a wide range of gain phase configurations. The generalized common phase configuration includes three basic blocks of capacitor positions, the L, M and N blocks, each of which includes a series capacitor component position and a parallel capacitor component position. The L block is connected between the input node Vin and the circuit common, sometimes referred to as the third node. The M block of capacitor positions is connected between the input node Vin and the output node Vsc. Finally the N block of capacitor positions is connected between the output node Vsc and the circuit common. As will be explained, an actual switched capacitor array circuit does not necessarily have capacitors in each of the three block positions L, M and N.

The series component capacitor positions of each block includes S number of capacitors connected in series and the parallel component capacitor positions includes P number of capacitors connected in parallel. The individual S and P number of capacitors preferably, but not necessarily, have the same capacitance. Further, the individual S and P number of capacitors can each be implemented using plural capacitors connected in parallel or series. As also will be explained, each capacitor block used in an actual switched capacitor array circuit may or may not include both a parallel and a series capacitor component.

A switched capacitor array circuit in accordance with the present invention is periodically switched between the generalized common phase configuration of FIG. 4 and one of what is sometimes a plurality of different gain phase configuration, with each gain phase providing a particular gain state value Gsc. For a switched capacitor array circuit having the capability of providing plural gain state values Gsc, the number of capacitors used to determine the gain state value in the gain phase configuration will usually, but not always, be less than the number of capacitors used in the common phase configuration, as will be explained.

Certain conditions apply to each of the gain phase configurations. First, all of the series component capacitors of the common phase configuration will be connected in parallel in the gain phase configuration. Second, a number ranging from none to all of the parallel component capacitors of the common phase configuration will be connected in series in the gain phase configuration. Those parallel component capacitors not connected in series in the gain phase configuration will remain in the same location in both the gain and common phase configurations. Thus, all of the capacitors from one of the L, M or N blocks of capacitor positions that are connected in series in one of the common or the gain phase configurations will be connected in parallel in the other one of the common and gain phase configurations thereby ensuring that the voltage drops across the capacitors will tend to be equal, regardless of the actual capacitance values of the capacitors and regardless of the discharge of the capacitors as a result of a transfer of charge to the load.

Note that the "+" designation associated with each capacitor functions to identify one of the two terminals associated with the capacitor. This information is relevant, for example, when the terminals of a capacitor are reversed when the capacitor array is switched in the manner described below. The "+" terminals of the capacitors are sometimes referred to herein as "facing" one of the nodes associated with the array. By way of example, the "+" terminals of all of the capacitors located in the M block of FIG. 4 are shown "facing" input node Vin whereas the "+" terminals of capacitors in the N block are shown "facing" the output node Vsc.

Figure 5A:
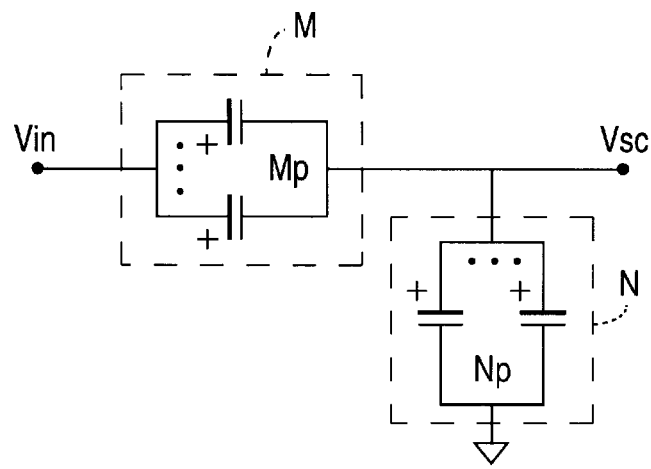
FIG. 5A shows a more specific common phase configuration of a switched capacitor array circuit in accordance with the present invention based upon the generalized common phase configuration of FIG. 4 together with a compatible gain phase configuration shown in FIG. 5B.

The foregoing can be further illustrated by a few examples. A first example is illustrated in FIG. 5A which shows a common phase configuration derived from the generalized common phase configuration of FIG. 4. The FIG. 5A common phase configuration incorporates M and N capacitor blocks, but not an L capacitor block. Further, the M and N capacitor blocks include only parallel capacitor components P and no series component capacitors S. For cases where a block includes only a single capacitor, the capacitor can be assumed to be either located in a series or a parallel component position of the block. Assuming that the array is implemented to provide only a single gain state value Gsc, the number $M_P$ represents the number of parallel component capacitors in the M capacitor block and the number $N_P$ represents the number of N parallel component capacitors in the N capacitor block.

If the switched capacitor array circuit is implemented to provide plural gain state values Gsc, the number of capacitors that determine the gain in the gain state configuration will sometimes differ from the number of capacitors used in the common phase configuration. In that case, the number $M_P$ represents the number of block M parallel component capacitors that are connected in series in the gain phase configuration. The number $N_P$ represents the number of block N parallel component capacitors that are connected in series in the gain phase configuration. Thus, if there are three parallel component capacitors in the M block in the common phase configuration and only two are connected in series in the gain phase configuration, the number $M_P$ is two. The same will be true for all L block parallel component capacitors where the value of $L_P$ is determined by the number of L block parallel component capacitors used in the gain phase configuration. The foregoing will be clarified later by some examples.

If the common phase configuration includes series capacitor components, the series component capacitors for each capacitor block L, M and N will be connected in parallel in the gain phase configuration, as previously described. Thus, the values of $L_S$, $M_S$ and $N_S$ will be the same for both the gain phase and the common phase configuration.

Figure 5B:
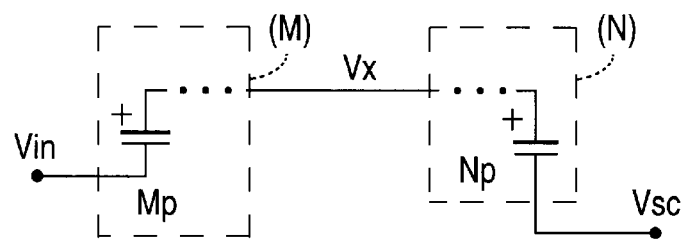

FIG. 5B shows an exemplary gain phase configuration which corresponds with the exemplary common phase configuration of FIG. 5A. The capacitors associated with capacitor blocks M and N are both connected in series between the input node Vin and the output node Vsc. Note the polarity of the capacitor connections indicated by the "+" designation. In FIG. 5A, for example, first terminals of each of the M block capacitors are connected facing the input node Vin whereas the same capacitors shown in FIG. 5B have the first terminals reversed facing the output node Vsc.

Since the M and N capacitor blocks only include parallel component capacitors ($M_P$ and $N_P$), the capacitors are connected in series in the gain phase configuration. It is important to note that the designations "(L)", "(M)" and "(N)" used in the various gain phase configurations, including that of FIG. 5B, indicate the origin, that is, the location of the capacitors in the common phase configuration. For example, in FIG. 5B, the designation "(M)" indicates that the $M_P$ capacitors are disposed in the M block of capacitor positions in the common phase configuration and, in particular, the parallel positions of the M block . Similarly, the designation "(N)" in FIG. 5B indicates that the $N_P$ capacitors came from N block of capacitor positions in the common phase configuration. In fact, both the $M_P$ and $N_P$ capacitors are disposed in the M block of capacitor positions in the gain phase configuration of FIG. 5B since the capacitors are disposed intermediate the input node Vin and the output node Vsc, that being the definition of the M block of capacitor positions.

Depending upon the particular values of $M_P$ and $N_P$, the gain phase configuration of FIG. 5B is capable of providing a wide range of gain state values Gsc. As can be seen from the FIG. 5A common phase configuration, the voltage across each of the parallel M block capacitors is (Vin−Vsc). Thus, when the M block capacitors are connected in series in FIG. 5B, the total drop across the series combination is $M_P$(Vin−Vsc) By inspection of FIG. 5B, it can be seen that the voltage $V_X$ at the node intermediate blocks M and N is as follows:

$$V_X = Vin + M_P(Vin - Vsc) \quad (16)$$

As can be seen from FIG. 5A, the output voltage across each of the N block capacitors is Vsc so that, when the capacitors are connected in series in FIG. 5B, the total voltage is $N_P$(Vsc). Thus, by inspection of FIG. 5B, the output voltage Vsc can be expressed as follows:

$$Vsc = V_X - N_P(Vsc) \quad (17)$$

Combining equations (16) and (17) gives $$Vsc = Vin + M_P(Vin - Vsc) - N_P(Vsc) \quad (18)$$

Thus, the gains Gsc achievable from the configuration of FIGS. 5A and 5B is as follows:

$$Gsc = Vsc/Vin = (1 + M_P)/(1 + M_P + N_P) \quad (19)$$

Table 1 below sets forth the gain state values Gsc assuming that the total number of capacitors is four or less. Additional capacitors could be used with a resultant increase in complexity. The values of Gsc in Table 1 that are underlined are achieved using a total of four capacitors, with the remaining gains achieved using three capacitors.

TABLE 1

| $M_P$ | $N_P$ | Gsc |
|---|---|---|
| 0 | 0 to 4 | 1, 1/2, 1/3, 1/4, 1/5 |
| 1 | 0 to 3 | 1, 2/3, 2/4, 2/5 |
| 2 | 0 to 2 | 1, 3/4, 3/5 |
| 3 | 0 to 1 | 1, 4/5 |
| 4 | 0 | 1 |

As can be seen from Table 1, some of the gains Gsc are redundant. However, a relatively large number of gains are available, including gains in ⅕ increments. As previously noted, all of the gain phase configuration used in an actual switched capacitor array circuit should have the same common phase configuration. Not all of the gain phase configurations shown in Table 1 have a common phase configuration as will be explained.

Once a certain number of capacitors is committed to one of the three L, M and N blocks of capacitor positions in the common phase configuration, the capacitors are not available for the other blocks. As an example, assume that four capacitors are used in the common phase configuration of FIG. 5A, two of which are parallel component capacitors in the M block and two of which are parallel component capacitors of the N block. This combination defines one possible common phase configuration in accordance with FIG. 5A. Assume, for example, that the M and N block each have two capacitors. It is, therefore, not possible for either $M_P$ or $N_P$ to exceed two, although each can be less.

Table 2 below shows all of the potential gain phase configurations in accordance with FIG. 5B that are compatible with this common phase configuration. There are a total of eight different gain phase configurations which produce a total of eight gain state values Gsc which are calculated in accordance with equation (19). These values of Gsc are a subset of those set forth in Table 1. Six of the gain state

TABLE 2

| $M_P$ | $N_P$ | Gsc |
|---|---|---|
| 0 | 0 to 2 | 1, 1/2, 1/3 |
| 1 | 0 to 2 | 1, 2/3, 2/4 |
| 2 | 0 to 2 | 1, 3/4, 3/5 | values are non-redundant (1, ¾, ⅔, ½, ⅓, ¼ and ⅗).

Note that all capacitors present in the common phase configuration and which are not used in a particular gain phase configuration remain in the common phase configuration when the switched capacitor array is switched from the common phase configuration to the particular gain configuration. The unused capacitor or capacitors will thus maintain the desired voltage drop so that proper operation is maintained when the array is switched to a gain phase configuration where the capacitor is used.

Figure 6:
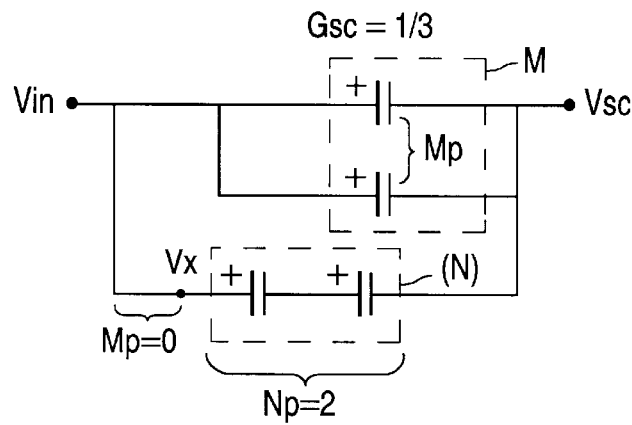
FIG. 6 shows one specific implementation of one gain phase configuration for the FIG. 5A and 5B switched capacitor array circuit for $M_P$=0 and $N_P$=2.

By way of example, FIG. 6 shows an implementation of a gain phase configuration for a gain state value Gsc=⅓ taken from Table 2. The figure shows the location of the four capacitors, two from the M block and two from the N block.

As indicated by equation (19) and as shown in Table 2 above, Gsc is ⅓ when $M_P=0$ And $N_P=2$. The two N block capacitors connected in the path containing node $V_X$ are the capacitors that determine the gain state value and thus determine the value of $M_P$ and $N_P$. Since $M_P=0$, the two M block capacitors remain in the common phase configuration connected in parallel between Vin and Vsc (block M) as shown in FIG. 6. As previously noted, the capacitors that remain in the common phase configuration do not determine the value of Gsc.

Figure 7:
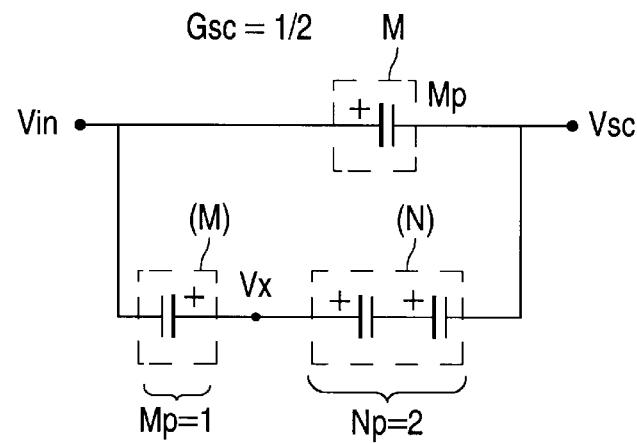
FIG. 7 shows another specific implementation of one gain phase configuration for the FIGS. 5A and 5B switched capacitor array circuit.

FIG. 7 depicts a second implementation of a gain phase configuration from Table 2 that uses two M block and two N block capacitors in the common phase configuration and which provides a gain state value of Gsc=½. $M_P$ is equal to one so that one of the M block capacitors is connected in series with node $V_X$, with the second N block capacitor remaining in the common phase position as shown in FIG. 7. $N_P$ is equal to two so the both of the N block capacitors are connected in series with node $V_X$.

Figure 8A:
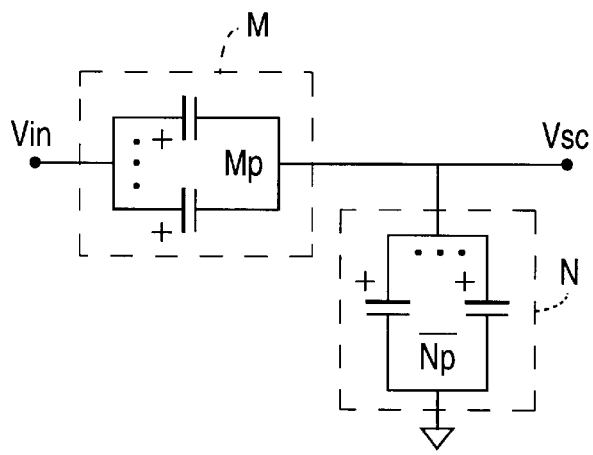
FIG. 8A shows another more specific common phase configuration of a switched capacitor array circuit in accordance with the present invention based upon the generalized common phase configuration of FIG. 4 together with a compatible gain phase configuration shown in FIG. 8B.
Figure 8B:
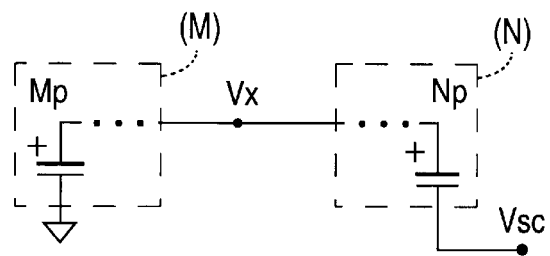

FIG. 8A shows a further variation of the generalized common phase configuration of FIG. 4. The configuration is the same as FIG. 5A and includes only parallel component N and N block capacitors. FIG. 8B is a gain phase configuration that is compatible with the FIG. 8A common phase configuration. Note that the N and N block capacitors are connected between the output node Vsc and the circuit common in the FIG. 8B gain phase configuration as opposed to the FIG. 5B configuration where the capacitors are connected between the input and output nodes Vin and Vsc.

The gain state value for the FIG. 8B configuration is determined in the same manner as the FIG. 5B configuration. As was the case of the FIG. 5A common phase configuration, it can be seen from FIG. 8A that the voltage drop across each of the M block capacitors is (Vin−Vsc) and the voltage drop across each of the N block capacitors is Vsc. By inspection of FIG. 8B, the voltage $V_X$ at the intermediate node is as follows:

$$V_X = M_P(Vin - Vsc) \quad (20)$$

In addition, it can be seen by inspection that the output voltage is as follows:

$$Vsc = V_X - N_P(Vsc) \quad (21)$$

Combining equations (20) and (21) gives the following:

$$Vsc(1 + M_P + N_P) = M_P Vin \quad (22)$$

Solving equation (22) for the gain state value gives the following:

$$Gsc = Vsc/Vin = M_P/(1 + M_P + N_P) \quad (23)$$

It can be seen from equation (23) that the gain phase configuration requires at least one M block capacitor be present ($M_P \geq 1$). Table 3 below sets forth the gain state values Gsc assuming that the total number of capacitors is four or less.

TABLE 3

| $M_P$ | $N_P$ | Gsc |
|---|---|---|
| 1 | 0 to 3 | 1, 1/3, 1/4, 1/5 |
| 2 | 0 to 2 | 2/3, 2/4, 2/5 |
| 3 | 0 to 1 | 3/4, 3/5 |
| 4 | 0 | 4/5 |

Note that since the common gain configurations of FIGS. 5A and 8A are the same, it is possible to implement a switched capacitor array circuit having gain state values Gsc from either Table 1 and/or Table 3.

Figure 9A:
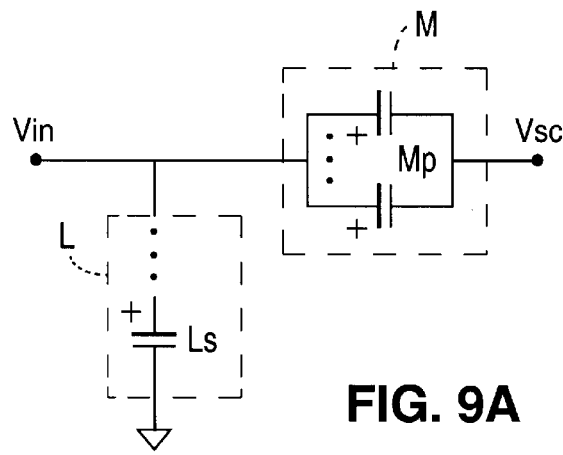
FIG. 9A shows another more specific common phase configuration of a switched capacitor array circuit in accordance with the present invention based upon the generalized common phase configuration of FIG. 4 together with two compatible gain phase configurations shown in FIGS. 9B and 9C.
Figure 9B:
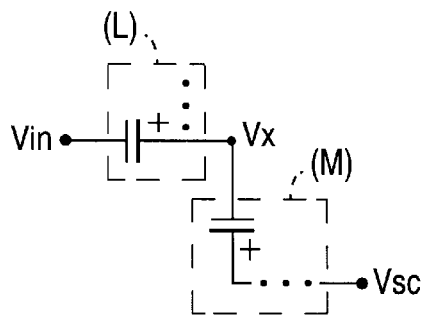
Figure 9C:
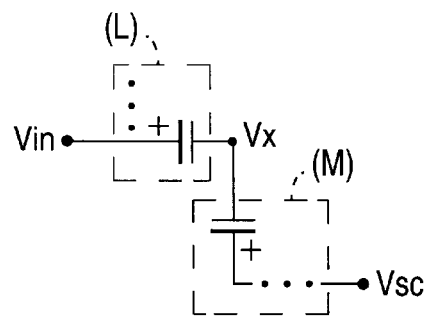

FIG. 9A shows a further common phase configuration based upon the generalized configuration of FIG. 4. In this case, the common phase configuration includes only the series capacitor component of capacitor block L, only the parallel component of capacitor block N and no capacitors of block N. FIGS. 9B and 9C depicts two gain phase configurations compatible with the FIG. 9A common phase configuration.

Referring to the common phase configuration of FIG. 9A, $L_S$ number of series component capacitors are connected in series between the input node Vin and ground. The $L_S$ capacitors will be connected in parallel in the gain phase configurations so that it is known that the voltage drop across each of the $L_S$ capacitors is equal and is Vin/$L_S$. The voltage drop across each of the M block capacitors is (Vin−Vsc).

Inspection of FIG. 9B indicates that the voltage at node VX is the sum of the input voltage and the voltage across the parallel connection of the L block capacitors as follows:

$$V_X = Vin + Vin/L_S \quad (24)$$

Further, the output voltage Vsc can be expressed as follows:

$$Vsc = V_X + M_P(Vin - Vsc) \quad (25)$$

Solving for the gains state values Gsc gives the following:

$$Gsc = Vsc/Vin = 1 + 1/(L_S(M_P + 1)) \quad (26)$$

It can be seen from equation (26) that $L_S$ must be greater than zero. Table 4 below shows the various gain state values Gsc that can be achieved from the FIG. 9B gain phase configuration. These configurations all provide values of Gsc greater than one and thus can be used in a boost type regulator.

TABLE 4

| $L_S$ | $M_P$ | Gsc |
|---|---|---|
| 1 | 0 to 3 | 2, 3/2, 4/3, 5/4 |
| 2 | 0 to 2 | 3/2, 5/4, 7/6 |
| 3 | 0 to 1 | 4/3, 7/6 |
| 4 | 0 | 5/4 |

Again, all of the underlined values of Gsc were obtained using four capacitors with the remaining requiring three capacitors.

Common gain phase configuration which utilize serial component capacitors, such as the FIG. 9A configuration, are limited to the extent that the values of $L_S$, $M_S$ and $N_S$, once selected, are fixed. These values are determined by the number of serial component capacitors used in the L, M and N blocks for the common phase configuration. If the number of capacitors used were changed for a particular configuration, the goal of having a common phase configuration which is the same for all gain configurations would not be met. Thus, for example, if a single serial capacitor is used in the L capacitor block in the common phase configuration, the value of $L_S$ is fixed at 1 and cannot be altered.

Figure 10:
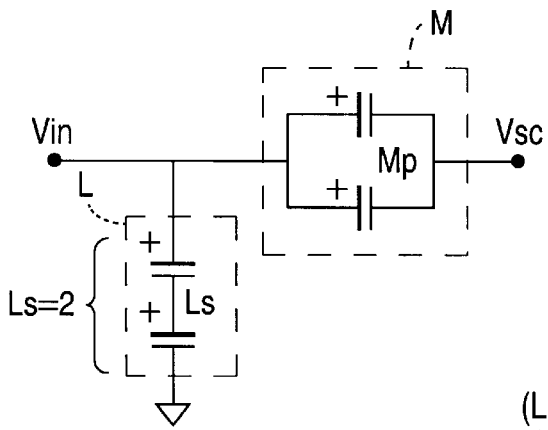
FIG. 10 is a specific implementation of switched capacitor array in a common phase configuration based upon the more general common phase configuration of FIG. 9A assuming that $L_S=2$ and $M_P=2$.

FIG. 10 shows an actual implementation of the FIG. 9A common phase configuration using four capacitors, two of which are the series component capacitors of the L block and two of which are the parallel component capacitors of the M block. Thus, the value of $L_S$ is fixed at 2, with the value of $M_P$ capable of being changed from 0 to 2. Table 5 below shows the possible gain state values Gsc for the FIG. 9A common phase configuration, with the values being a subset of those set forth in Table 4.

TABLE 5

| $L_S$ | $M_P$ | Gsc |
|---|---|---|
| 2 | 0 to 2 | 3/2, 5/4, 7/6 |

Figure 11:
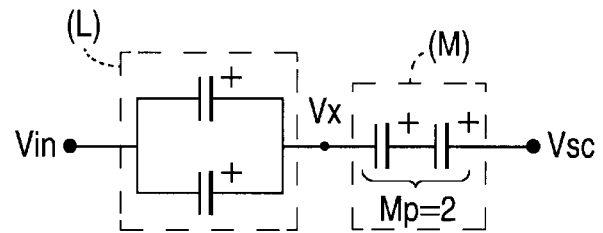
FIG. 11 is a specific implementation of switched capacitor array in a gain phase configuration based upon the more general gain phase configuration of FIG. 9A assuming that $L_S=2$ and $M_P=2$.

FIG. 11 is an exemplary gain phase configuration based upon the FIG. 9B configuration which provides a gain state value of Gsc=⅞. This is based upon $L_S$ and $M_P$ both being 2. It is apparent from inspection of FIG. 11 that the number of the serial component capacitors from the L block connected in parallel does not affect the value of Gsc. Rather, it is the number of serial component capacitors in the common phase of FIG. 10 that controls Gsc and thus determines $L_S$. As indicated by Table 5, the value of Gsc is adjusted by varying $M_P$ from 0 to 2.

The second gain phase configuration compatible with the FIG. 9A common phase configuration is shown in FIG. 9C. This configuration differs from that of FIG. 9B in that the polarity of the L block capacitors is reversed from that of FIG. 9B. Thus, the exemplary implementations of FIGS. 10 and 11 are applicable to the FIG. 9C configuration, with the exception of the polarity of the L block capacitors of FIG. 11.

The voltage at node $V_X$ of FIG. 9C is similar to that of equation (24) other than the polarity of the voltage drop across the L block capacitor and is as follows:

$$Vx = Vin - Vin/L_S \qquad (27)$$

The output voltage Vsc is the same as set forth in equation (25), therefore combining equations (25) and (27) give the following for the gain state value Gsc:

$$Gsc = Vsc/Vin = 1 - 1/(L_S(M_P+1)) \qquad (28)$$

Again, the value of $L_S$ must be greater than 0. In addition, $M_P$ cannot be 1 when $L_S$ is 1 because the value of Gsc will be 0. The configuration will produce the values of Gsc set forth in Table 6 below.

TABLE 6

| $L_S$ | $M_P$ | Gsc |
|---|---|---|
| 1 | 1 to 3 | 1/2, 2/3, 3/4 |
| 2 | 0 to 2 | 1/2, 3/4, 5/6 |
| 3 | 0 to 1 | 2/3, 5/6 |
| 4 | 0 | 3/4 |

Since only one value of $L_S$ can be used in an actual implementation, the total number of gain state values Gsc of Table 6 is somewhat limited. However, once a value for $L_S$ is chosen, gain state values associated with either FIG. 9B and 9C can be achieved since there is one common phase configuration, shown in FIG. 9A, for both gain phase configurations. Table 7 shows, for example, the gains phase values Gsc for $L_S$=2, with these values being taken from Tables 5 and 6.

TABLE 7

| $L_S$ | $M_P$ | Gsc |
|---|---|---|
| 2 | 0 to 2 | 3/2, 5/4, 7/6 |
|   |   | 1/2, 3/4, 5/6 |

Figure 12A:
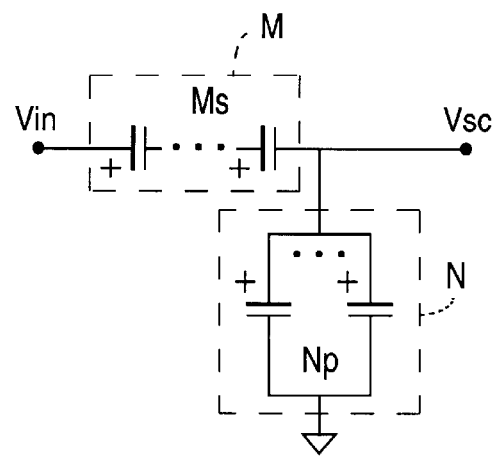
FIG. 12A shows another more specific common phase configuration of a switched capacitor array circuit in accordance with the present invention based upon the generalized common phase configuration of FIG. 4 together with two compatible gain phase configurations shown in FIGS. 12B and 12C.
Figure 12B:
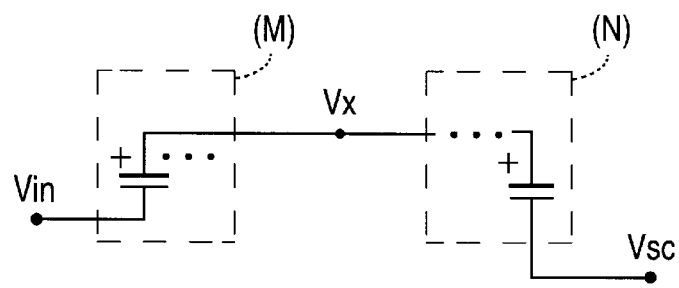
Figure 12C:
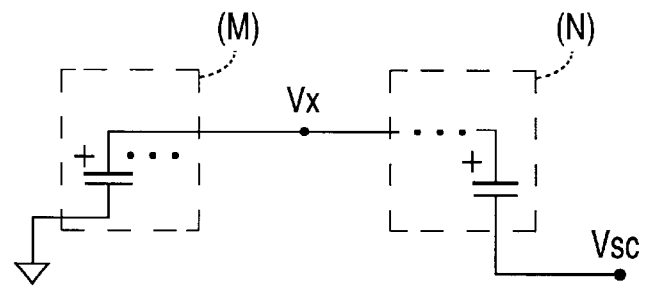

FIG. 12A shows a further common phase configuration based upon the generalized configuration of FIG. 4. FIGS. 12B and 12C are two gain phase configuration compatible with the FIG. 12A common phase configuration. Only M and N block capacitors are used. The M block of the common phase configuration includes only the serial component capacitors and the N block includes only the parallel component capacitors. The value of $M_S$ is the number of serial capacitors present in the common phase and the value $N_P$ is the number of N block capacitors connected in series in the gain phase.

The various gain state values provided by the FIG. 12B will now be determined. The voltage at intermediate node $V_X$ is as follows:

$$V_X = Vin + (Vin - Vsc)/M_S \qquad (29)$$

The output voltage Vsc is:

$$Vsc = V_X - N_P Vsc \qquad (30)$$

Combining equations (29) and (30) gives the following:

$$Gsc = Vsc/Vin = (M_S+1)/(M_S+1+M_S N_P) \qquad (31)$$

The gain state value Gsc for the FIG. 12C configuration is calculated in a similar manner and is as follows:

$$Gsc = Vsc/Vin = 1/(M_S+1+M_S N_P) \qquad (32)$$

Table 8 shows the various gain state values Gsc for the FIG. 12B gain phase configuration for four capacitors. The underlined values of Gsc are those achieved using a total of four capacitors.

TABLE 8

| $M_S$ | $N_P$ | Gsc |
|---|---|---|
| 1 | 0 to 3 | 1, 2/3, 1/2, 2/5 |
| 2 | 0 to 2 | 1, 3/5, 3/7 |
| 3 | 0 to 1 | 1, 4/7 |
| 4 | 0 | 1 |

Table 9 below shows the values of Gsc for the FIG. 12C gain phase configuration under the same conditions

TABLE 9

| $M_S$ | $N_P$ | Gsc |
|---|---|---|
| 1 | 0 to 3 | 1/2, 1/3, 1/4, 1/5 |
| 2 | 0 to 2 | 1/3, 1/5, 1/7 |
| 3 | 0 to 1 | 1/4, 1/7 |
| 4 | 0 | 1/5 | for Table 8 including a maximum of four capacitors and $M_S$ greater than 0. Gain state values from both gain phase configurations (FIGS. 12B and 12C) can be implemented in a single switched capacitor array circuit. Note again that an actual array circuit can have only a single value of $M_S$ since varying $M_S$ will create a different common phase configuration. Thus, for example, assuming that $M_S$ is 2, Table 10 shows all of the gain configurations that can be achieved based upon Tables 8 and 9.

TABLE 10

| $M_S$ | $N_P$ | Gsc |
|---|---|---|
| 2 | 0 to 2 | 1, 3/5, 3/7 |
|   |   | 1/3, 1/5, 1/7 |

Figure 13A:
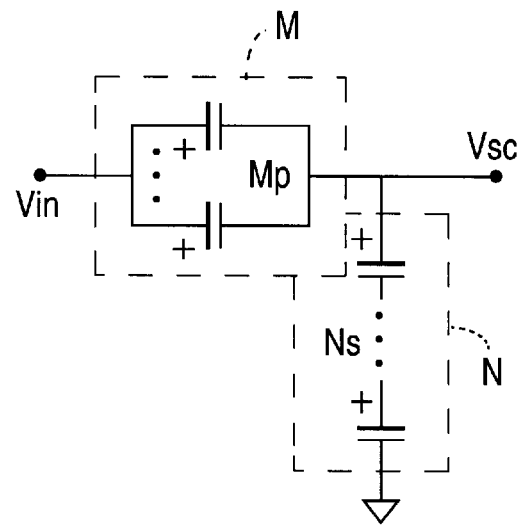
FIG. 13A shows another more specific common phase configuration of a switched capacitor array circuit in accordance with the present invention based upon the generalized common phase configuration of FIG. 4 together with two compatible gain phase configurations shown in FIGS. 13B and 13C.
Figure 13B:
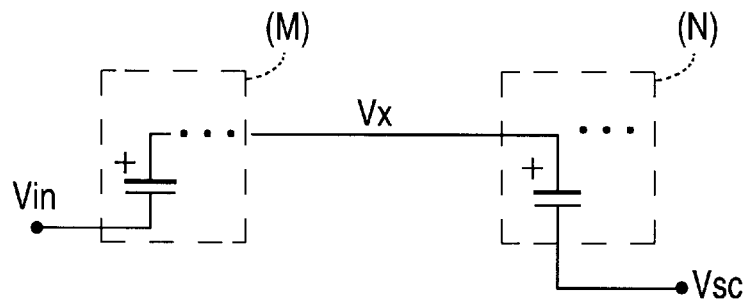
Figure 13C:
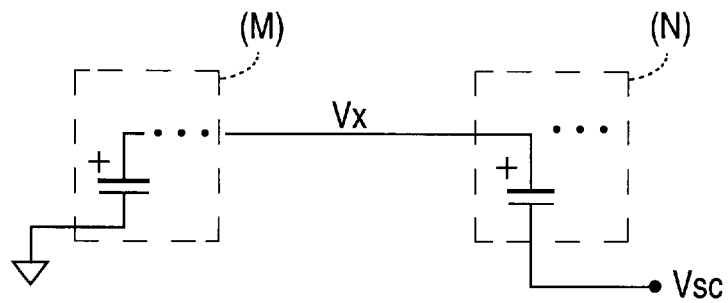

FIG. 13A is a further example of a common phase configuration based upon the generalized common phase configuration of FIG. 4. FIGS. 13B and 13C are two gain phase configurations that are compatible with the FIG. 13A common gain configuration. The common phase configuration has only series component N block capacitors and only parallel component M block capacitors. Again, the value of $N_S$ is determined by the number of series N block capacitors used in the common phase configuration of FIG. 13A and the value $M_P$ is determined by the number of series M block capacitors used in either the FIG. 13B or the FIG. 13C gain phase configurations.

Performing an analysis similar to that set forth in connection with previous examples, the gain state value Gsc for the FIG. 13B gain phase configuration is as follows:

$$Gsc=Vsc/Vin=(N_S+N_SM_P)/(N_S+N_SM_P+1) \quad (33)$$

Table 11 below shows the various values of Gsc for the FIG. 13B gain phase configuration in combination with the FIG. 13A common phase configuration using up to a total of four capacitors. The underlined values of Gsc are obtained using four capacitors.

TABLE 11

| $M_P$ | $N_S$ | Gsc |
|---|---|---|
| 0 | 1 to 4 | 1/2, 2/3, 3/4, 4/5 |
| 1 | 1 to 3 | 2/3, 4/5, 6/7 |
| 2 | 1 to 2 | 3/4, 6/7 |
| 3 | 1 | 4/5 |

The gain state value Gsc for the FIG. 13C configuration is as follows:

$$Gsc=Vsc/Vin=N_SM_P/(N_S+N_SM_P+1) \quad (34)$$

Table 12 sets forth the values of Gsc for the FIG. 13C gain phase configuration in combination with the FIG. 13A common phase configuration using up to a total of four capacitors. As can be seen from equation (34), both $M_S$ and $M_P$ must be at least one. The underlined values of Gsc are obtained using four capacitors.

TABLE 12

| $M_P$ | $N_S$ | Gsc |
|---|---|---|
| 1 | 1 to 3 | 1/3, 1/5, 1/7 |
| 2 | 1 to 2 | 1/2, 4/7 |
| 3 | 1 | 3/5 |

Since only one value of $N_S$ can be used in an actual switched capacitor array circuit, Table 13 shows the values of Gsc for an exemplary array using the common phase configuration of FIG. 13A and both gain phase configurations of FIGS. 13B and 13C. Table 13 is based upon the assumption that there are four capacitors, that $N_S$ is 2 and that $M_P$ must be at least 1.

TABLE 13

| $M_P$ | $N_S$ | Gsc |
|---|---|---|
| 1 to 2 | 2 | 4/5, 1/5, 6/7, 4/7 |

Figure 14A:
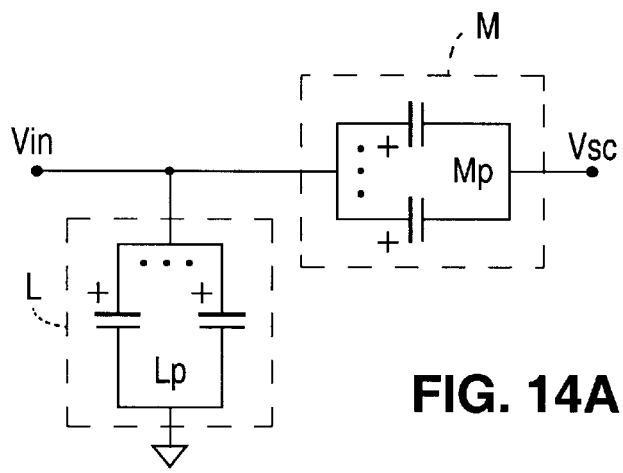
FIG. 14A shows another more specific common phase configuration of a switched capacitor array circuit in accordance with the present invention based upon the generalized common phase configuration of FIG. 4 together with one compatible gain phase configuration shown in FIG. 14B.
Figure 14B:
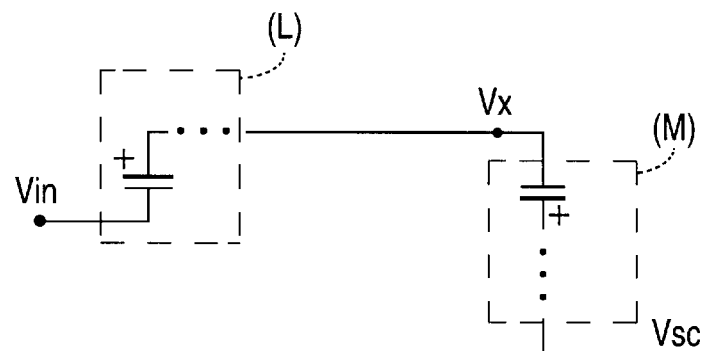

FIG. 14A is a still further exemplary common phase configuration based upon the generalized common phase configuration and FIG. 14B is one gain phase configuration compatible with the common phase configuration of FIG. 14A. In the common phase configuration, which includes only the parallel components of the L and M block capacitors, the values of $L_P$ and $M_P$ are determined by the number of L and M block capacitors connected in series in the gain phase configuration.

The values of Gsc for the configuration of FIGS. 14A and 14B are determined in the same manner as previously set forth and is as follows:

$$Gsc=Vsc/Vin=(1+M_P+L_P)/(1+M_P) \quad (35)$$

Table 14 below shows the possible values of Gsc in accordance with equation (35), with there being a maximum of four capacitors.

TABLE 14

| $L_P$ | $M_P$ | Gsc |
|---|---|---|
| 1 | 0 to 3 | 2, 3/2, 4/3, 5/4 |
| 2 | 0 to 2 | 3, 2, 5/3 |
| 3 | 0 to 1 | 4, 5/2 |
| 4 | 0 | 5 |

As was the case of the other configurations previously discussed, an actual switched capacitor array circuit would not be capable of achieving all of the gain state values Gsc of Table 14 in that capacitors assigned to one of the major blocks, in this case the L and M blocks, cannot be used in another one of the blocks. Thus, if $L_P$ has a maximum value of 2, meaning that $L_P$ can range from 1 to 2, $M_P$ is limited to a maximum value of 2 since the total maximum assumed in the example is 4.

Figure 15A:
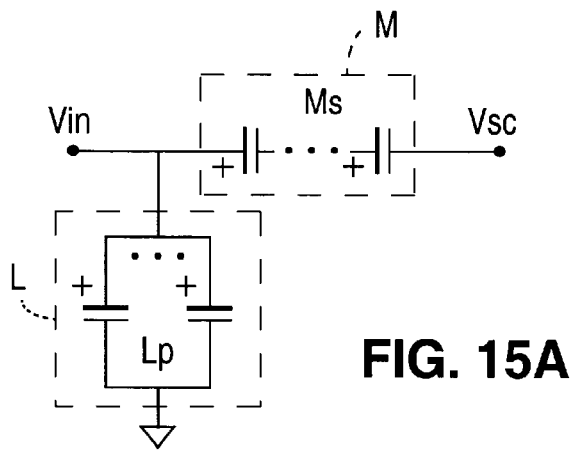
FIG. 15A shows another more specific common phase configuration of a switched capacitor array circuit in accordance with the present invention based upon the generalized common phase configuration of FIG. 4 together with one compatible gain phase configuration shown in FIG. 15B.
Figure 15B:
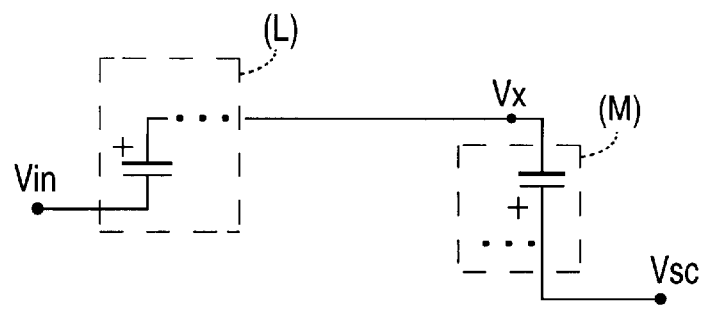

FIGS. 15A and 15B are further exemplary common and gain phase configurations, respectively. The configurations utilize L and M block capacitors, with the L block being comprised solely of parallel component capacitors and the M block being comprised solely of series component capacitors. Thus, the value of $L_P$ is determined by the number of L block capacitors present in the gain phase configuration and the value of $M_S$ is determined by the number of capacitors used in the common phase configuration.

The equation for Gsc for the FIG. 15B gain phase configuration is derived as before and is as follows:

$$Gsc=Vsc/Vin=(M_S+L_PM_S+1)/(M_S+1) \quad (36)$$

Assuming that $M_S$ is greater than 0, Table 15 shows the various values of Gsc assuming a maximum of four capacitors.

TABLE 15

| $L_P$ | $M_S$ | Gsc |
|---|---|---|
| 0 | 1 to 4 | 1, 1, 1 |
| 1 | 1 to 3 | 3/2, 5/3, 7/4 |
| 2 | 1 to 2 | 2, 7/3 |
| 3 | 1 | 5/2 |

When a switched capacitor array circuit is implemented, transistor switches are selected to make the necessary connections which are either N or P type depending upon the magnitude and polarity of the voltages being switched. In some cases, when the voltage range is large, both N and P type transistors can be used in parallel, with the transistors being driven by complementary signals. Further, in certain configurations, the intermediate node $V_X$ provides a boost voltage that can be used to control the N type transistor switches, particularly when the input and output voltages are both low.

Figure 16A:
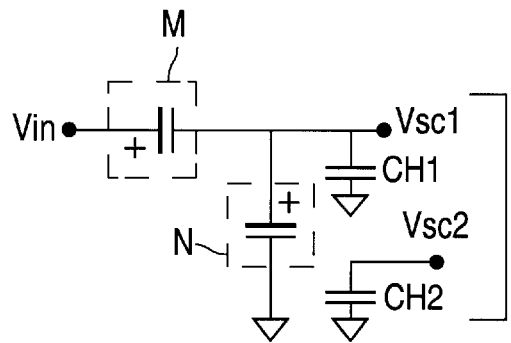
FIG. 16A shows a specific implementation of a common phase configuration of a two capacitor switched capacitor array circuit in accordance with the present invention having two outputs based upon the generalized common phase configuration of FIG. 4 together with two compatible gain phase configurations shown in FIGS. 16B and 16C.

It is also possible to utilize the intermediate nodes as a second output so as to provide additional gain state values. FIG. 16A shows a specific implementation of the common phase configuration using only a single capacitor in the M capacitor block and a single capacitor in the N capacitor block. Thus, the single M block capacitor can be considered either a serial or a parallel component capacitor as can the single N block capacitor. Accordingly, $M_P=M_S=1$ and $N_P=N_S=1$ so that the specific implementation can be considered to based upon any of the more general circuits of FIGS. 5A, 8A, 12A and 13A.

Figure 1A:
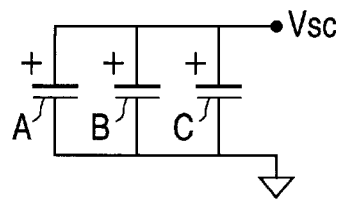
FIGS. 1A–1D are simplified diagrams depicting the common and gain phase configurations of a conventional switched capacitor array for use in a DC—DC voltage converter.
Figure 1B:
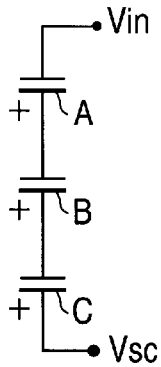
Figure 1C:
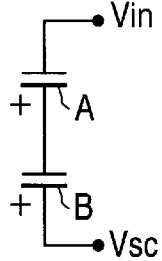
Figure 1D:
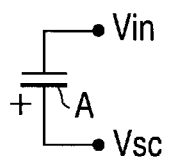
Figure 2A:
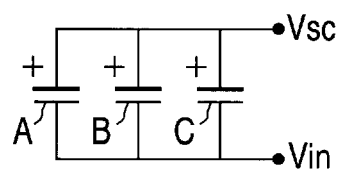
FIGS. 2A–2G are simplified diagrams depicting the common and gain phase configurations of a another conventional switched capacitor array for use in a DC—DC voltage converter.
Figure 2B:
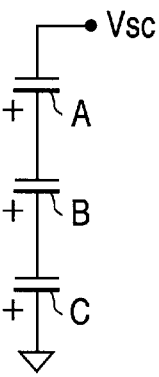
Figure 2C:
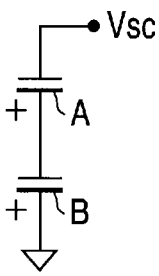
Figure 2D:
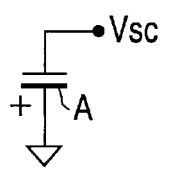
Figure 2E:
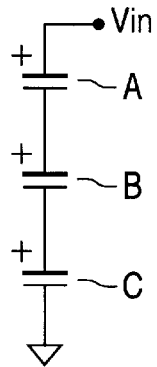
Figure 2F:
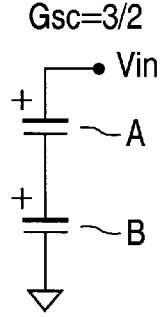
Figure 2G:
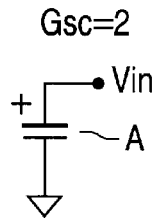
Figure 3:
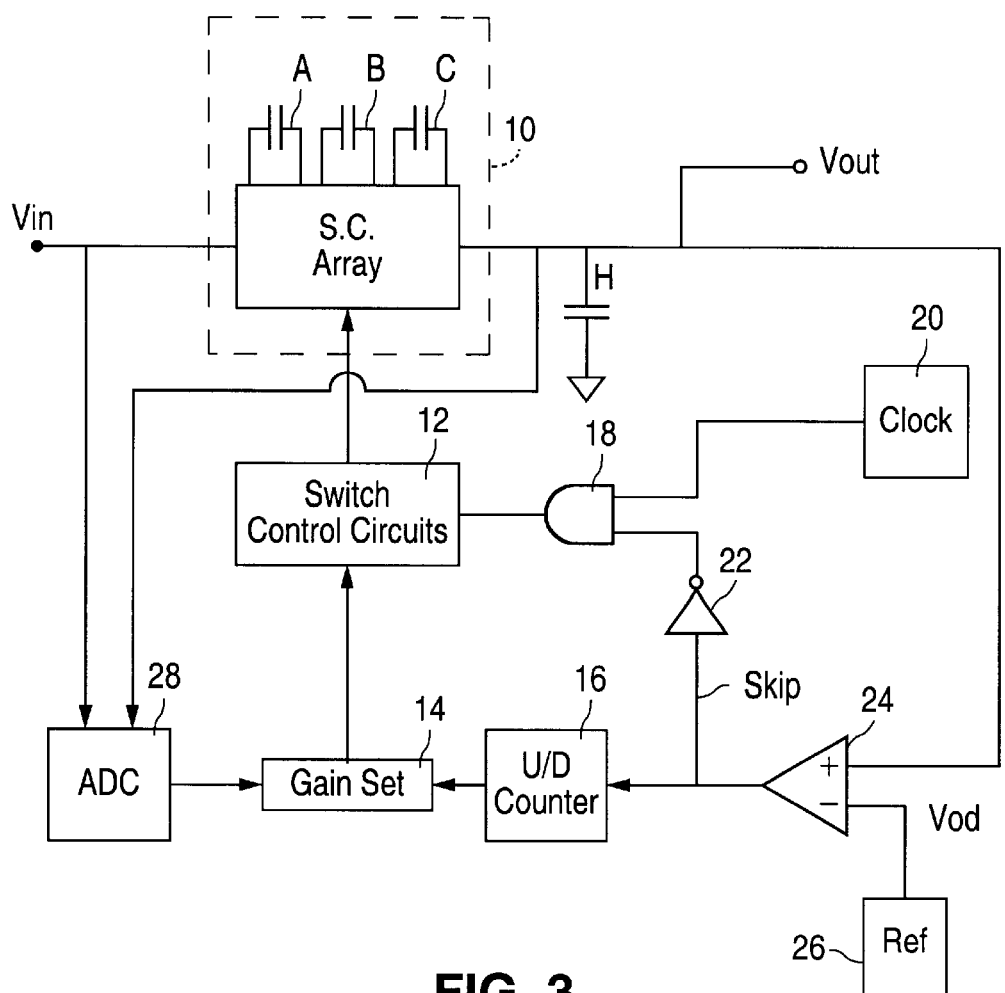
FIG. 3 is a block diagram of illustrating the architecture of a conventional DC—DC voltage converter of the type incorporating the switched capacitor array of FIGS. 1A–1D and FIGS. 2A–2G.

The FIG. 16A implementation includes two outputs including output Vsc1, the conventional output node, and an additional output Vsc2. Both outputs are connected to respective holding capacitors CH1 and CH2, with the second output Vsc2 otherwise floating in the common phase configuration. Holding capacitor CH1 is used in all of the previously described embodiments but is not shown in the drawings other than in FIG. 3 as capacitor H.

Figure 16B:
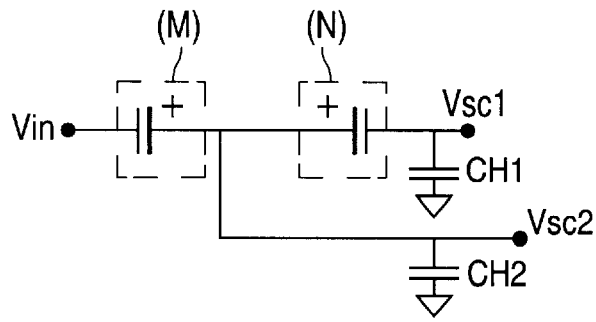

FIG. 16B shows one specific implementation of a gain phase configuration compatible with the specific two-capacitor implementation of the common phase configuration of FIG. 16A. The FIG. 16B circuit is a specific implementation of the more general FIGS. 5B, 12B and 13B gain phase configurations. The two capacitors are connected in series between the input node Vin and the output node Vsc1, with intermediate node $V_X$ of FIG. 16B being connected to the second output node Vsc2. The gain state value Gsc associated with output Vsc1 (Gsc1=Vsc1/Vin) was previously derived for the more general gain state configuration of FIG. 5B, for example. According to equation (19) the gain state value is ⅔ for $M_P$ and $N_P$ both equal to 1. Other gain state values are achievable as shown in Equation (31).

The gain state value Gsc associated with output Vsc2 of FIG. 16B can be derived from equations (16) and (17) assuming that voltage $V_X$ is equal to Vsc2. Assuming again the $M_P$ and $N_P$ are both 1, the value of Gsc2 (Gsc2=Vsc2/Vin) is ⅓.

Thus, the arrangements of FIGS. 16A and 16B provide two different voltages at outputs Vsc1 and Vsc2 using only two capacitors. Such a switched array circuit could be used, for example, for simultaneously powering two separate portions of a circuit requiring two different supply voltage magnitudes.

Figure 16C:
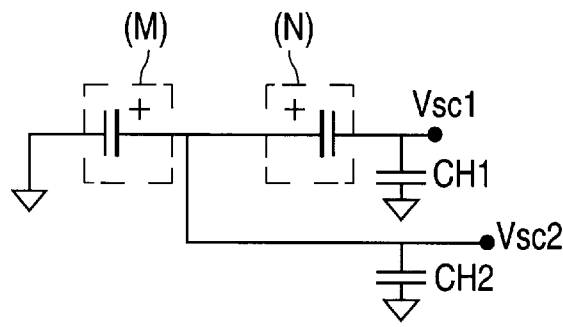

The FIG. 16C is a specific implementation of a gain phase configuration which is also compatible with the FIG. 16A implementation. The FIG. 16C implementation can be considered to be based upon the more general circuit of FIGS. 8B, 12C and 13C. In accordance, for example, with equation (23) the gain state value associated with output Vsc1 (Gsc1=Vsc1/Vin) for $M_P=N_P=1$ is ⅓. Combining equations (20) and (21) the gain state value associated with output Vsc2 (Gsc2=Vsc2/Vin) and solving for $V_X$/Vin (Vsc2/Vin) is ⅔ assuming again that $M_P=N_P=1$. Table 16 below summarizes the various gain state values that can be achieved for the two capacitor array of FIGS. 16A, 16B and 16C.

TABLE 16

| Gsc1 | Gsc2 |
|---|---|
| 2/3 | 4/3 |
| 1/3 | 2/3 |

Figure 17A:
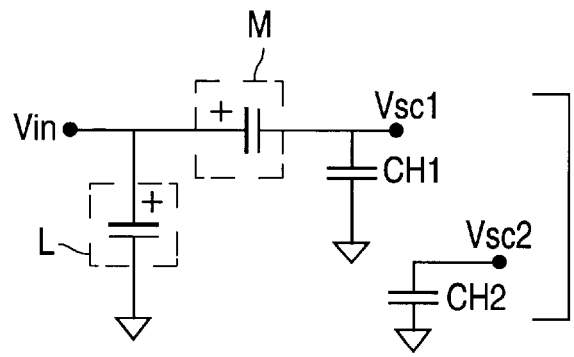
FIG. 17A shows a specific common phase configuration of a two capacitor switched capacitor array circuit in accordance with the present invention having two outputs based upon the generalized common phase configuration of FIG. 4 together with a compatible gain phase configuration shown in FIG. 17B.
Figure 17B:
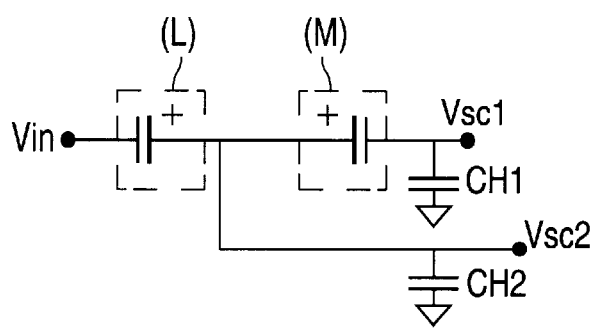

FIGS. 17A and 17B are a further example of a specific two capacitor implementation of a switched capacitor array circuit which provides two outputs Vsc1 and Vsc2. The common phase configuration of FIG. 17A utilizes a single capacitor in the L block and a single capacitor in the M block and is a specific implementation of the more general array circuit of FIGS. 9A, 14A and 15A common phase configurations. FIG. 17B is a more specific implementation of the more general gain configuration array circuit of FIGS. 9B, 14B and 15B. Since $L_P=L_S=M_P=M_S=1$, any of equations (26), (35) or (36) indicate that the gain state value associated with Vsc1 (Gsc1=Vsc1/Vin) is 3/2. The gain state value Gsc2 associated with output Vsc2, again setting Vsc2 equal to $V_X$, can be derived from, among others, equations (24) and (25). The gain state value Gsc2 is 2.

It is important to operate the transistor switches in a manner so that the various PN junctions associated with the switches do not become forward biased during operation. This problem is most likely to arise where there are a wide range of input and output voltages and a large number of different gain state values Gsc. Various techniques can be employed to maximize high efficiency operation and prevent the transistor junctions from becoming forward biased. The objective is to prevent any node voltage in the array from (1) exceeding the greater of the input voltage Vin and the output voltage Vout by more that a PN junction voltage drop and (2) falling below the minimum array voltage, typically circuit common, by more than a PN junction voltage drop. These voltage management techniques are more fully described in application Ser. No. 09/238,372 filed on Jan. 27, 1999 and entitled "Switched Capacitor Circuit Having Voltage Management and Method" the contents of which are hereby fully incorporated by reference into the present application.

Thus, a novel generalized common phase configuration together with associated gain phase configurations have been disclosed for implementing a wide range of switched capacitor array circuits. The switched capacitor array circuits provide a large number of gain state values, including values for buck and boost converters, using a relatively small number of capacitors. Although certain embodiments have been described in some detail, it is to be understood that certain changes can be made by those skilled in the art without departing from the spirit and scope of the invention as defined by the appended claims.

What is claimed is:

1. A switched capacitor array circuit coupled between an input node and an output node and capable of providing multiple gain state values, said array circuit including:
   an L bank of capacitor positions disposed intermediate the input node and a third node, with the L bank capacitor bank positions consisting of series capacitor positions and parallel capacitor positions;
   an M bank of capacitor positions disposed intermediate the input node and the output node, with the M bank capacitor bank positions consisting of series capacitor positions and parallel capacitor positions;
   an N bank of capacitor positions disposed intermediate the output node and the third node, with the N bank capacitor bank positions consisting of series capacitor positions and parallel capacitor positions;
   first, second and third capacitors;
   switching circuitry coupled to the capacitors and to the input node, the output node and third node; and
   control circuitry coupled to the switching circuitry and configured to switch the switched capacitor array circuit between a common phase configuration and a gain phase configuration so as to provide a gain state value, with the first and second capacitors being disposed in one of the L, M and N bank of capacitor positions and the third capacitor is disposed in a different one of the L, M and N bank of capacitor positions in the common phase configuration, wherein when switching from the common phase configuration to the gain phase configuration, at least one of the first, second and third capacitors is moved to a different capacitor position and wherein capacitors that are disposed in the series capacitor position in the common phase configuration are disposed in the parallel capacitor position in the gain phase configuration and wherein capacitors that are disposed in the parallel capacitor position in the common phase configuration are disposed in the series capacitor position in the gain phase configuration.

2. The switched capacitor array circuit of claim 1 wherein the different capacitor position is achieved by switching a polarity of the at least one of the first, second and third capacitors.

3. The switched capacitor array circuit of claim 1 wherein the different capacitor position is acheived by switching the at least one capacitor of the first, second and third capacitors between the series and parallel capacitor positions.

4. The switched capacitor array circuit of claim 1 wherein the different capacitor position is acheived by switching the at least one of the first, second and third capacitors from one of L, M and N bank of capacitor positions to another one of the L, M and N bank of capacitor positions.

5. The switched capacitor array circuit of claim 1 wherein the gain phase configuration is a first gain phase configuration, the gain position is a first gain position and the gain state value is a first gain state value and wherein the control circuitry is further configured to switch the switched capacitor array circuit between the common phase configuration and a second gain phase configuration so as to provide a second gain state value, different from the first gain state value.

6. The switched capacitor array circuit of claim 1 wherein the control circuitry operates such that the first and second capacitors are disposed in the M bank of capacitor positions and the third capacitor is disposed in the N bank of capacitor positions in the common phase configuration.

7. The switched capacitor array circuit of claim 6 wherein the first, second and third capacitors are in the M bank of capacitor positions in the gain phase configuration.

8. The switched capacitor array circuit of claim 7 wherein the first and second capacitors are disposed in the parallel capacitor positions of the M bank of capacitors in the common phase configuration.

9. The switched capacitor array circuit of claim 8 where the first and second capacitors each include first terminals which are facing the input node in the common phase configuration and the third capacitor includes a first terminal facing the output node in the common phase configuration and wherein the first terminals of the first and second capacitors are facing the output node and the first terminal of the third capacitor is facing the input node in the gain phase configuration.

10. The switched capacitor array circuit of claim 6 wherein the first, second and third capacitors are in the N bank of capacitor positions in the gain phase configuration.

11. The switched capacitor array circuit of claim 10 wherein the first and second capacitors are disposed in the parallel capacitor positions of the M bank of capacitors in the common phase configuration.

12. The switched capacitor array circuit of claim 11 where the first and second capacitors each include first terminals which are facing the input node in the common phase configuration and the third capacitor includes a first terminal facing the output node in the common phase configuration and wherein the first terminals of the first and second capacitors are facing the output node in the gain phase configuration and wherein the first terminal of the third capacitor is facing the third node in the gain phase configuration.

13. The switched capacitor array circuit of claim 1 wherein the control circuitry operates such that the first and second capacitors are disposed in the N bank of capacitor positions and the third capacitor is disposed in the M bank of capacitor positions in the common phase configuration.

14. The switched capacitor array circuit of claim 13 wherein the first, second and third capacitor are in the M bank of capacitor positions in the gain phase configuration.

15. The switched capacitor array circuit of claim 14 wherein the first and second capacitors are disposed in the parallel capacitor positions of the N bank of capacitors in the common phase.

16. The switched capacitor array circuit of claim 15 where the first and second capacitors each include first terminals which are facing the output node in the common phase configuration and the third capacitor includes a first terminal facing the input node in the common phase configuration and wherein the first terminals of the first and second capacitors are facing the input node in the gain phase configuration and wherein the first terminal of the third capacitor is facing the output node in the gain phase configuration.

17. The switched capacitor array circuit of claim 13 wherein the first, second and third capacitors are in the N bank of capacitor positions in the gain phase configuration.

18. The switched capacitor array circuit of claim 17 wherein the first and second capacitors are disposed in the parallel capacitor positions of the N bank of capacitors in the common phase configuration.

19. The switched capacitor array circuit of claim 18 where the first and second capacitors each include first terminals which are facing the output node in the common phase configuration and the third capacitor includes a first terminal facing the input node in the common phase configuration and wherein the first terminals of the first and second capacitors are facing the third node in the gain phase configuration and wherein the first terminal of the third capacitor is facing the output node in the gain phase configuration.

20. The switched capacitor array circuit of claim 1 wherein the control circuitry operates such that the first and second capacitors are disposed in the L bank of capacitor positions and the third capacitor is disposed in the M bank of capacitor positions in the common phase configuration.

21. The switched capacitor array circuit of claim 20 wherein the first, second and third capacitors are in the M bank of capacitor positions in the gain phase configuration.

22. The switched capacitor array circuit of claim 21 wherein the first and second capacitors are disposed in the series capacitor positions of the L bank of capacitors in the common phase configuration.

23. The switched capacitor array circuit of claim 22 where the first and second capacitors each include first terminals which are facing the input node in the common phase configuration and the third capacitor includes a first terminal facing the input node in the common phase configuration and wherein the first terminals of the first and second capacitors are facing the output node in the gain phase configuration and wherein the first terminal of the third capacitor is facing the output node in the gain phase configuration.

24. The switched capacitor array circuit of claim 22 where the first and second capacitors each include first terminals which are facing the input node in the common phase configuration and the third capacitor includes a first terminal facing the input node in the common phase configuration and wherein the first terminals of the first and second capacitors are facing the input node in the gain phase configuration and wherein the first terminal of the third capacitor is facing the output node in the gain phase configuration.

25. The switched capacitor array circuit of claim 1 wherein the control circuitry operates such that the first and second capacitors are disposed in the M bank of capacitor positions and the third capacitor is disposed in the L bank of capacitor positions in the common phase configuration.

26. The switched capacitor array circuit of claim 25 wherein the first, second and third capacitors are in the M bank of capacitor positions in the gain phase configuration.

27. The switched capacitor array circuit of claim 26 wherein the first and second capacitors are disposed in the parallel capacitor positions of the M bank of capacitors in the common phase configuration.

28. The switched capacitor array circuit of claim 27 wherein the first and second capacitors each include first terminals which are facing the input node in the common phase configuration and the third capacitor includes a first terminal facing the input node in the common phase configuration and wherein the first terminals of the first and second capacitors are facing the output node in the gain phase configuration and wherein the first terminal of the third capacitor is facing the output node in the gain phase configuration.

29. The switched capacitor array circuit of claim 27 wherein the first and second capacitors each include first terminals which are facing the input node in the common phase configuration and the third capacitor includes a first terminal facing the input node in the common phase configuration and wherein the first terminals of the first and second capacitors are facing the output node in the gain phase configuration and wherein the first terminal of the third capacitor is facing the input node in the gain phase configuration.

30. The switched capacitor array circuit of claim 1 wherein the control circuitry operates such that the first and second capacitors are disposed in the series capacitor position of the M bank of capacitor positions and the third capacitor is disposed in the N bank of capacitor positions in the common phase configuration.

31. The switched capacitor array circuit of claim 30 wherein the first, second and third capacitors are in the M bank of capacitor positions in the gain phase configuration.

32. The switched capacitor array circuit of claim 31 wherein the first and second capacitors each include first terminals which are facing the input node in the common phase configuration and the third capacitor includes a first terminal facing the output node in the common phase configuration and wherein the first terminals of the first and second capacitors are facing the output node in the gain phase configuration and wherein the first terminal of the third capacitor is facing the input node in the gain phase configuration.

33. The switched capacitor array circuit of claim 30 wherein the first, second and third capacitors are in the N bank of capacitor positions in the gain phase configuration.

34. The switched capacitor array circuit of claim 33 wherein the first and second capacitors each include first terminals which are facing the input node in the common phase configuration and the third capacitor includes a first terminal facing the output node in the common phase configuration and wherein the first terminals of the first and second capacitors are facing the output node in the gain phase configuration and wherein the first terminal of the third capacitor is facing the third node in the gain phase configuration.

35. The switched capacitor array circuit of claim 1 wherein the control circuitry operates such that the first and second capacitors are disposed in the series position of the N bank of capacitor positions and the third capacitor is disposed in M bank of capacitor positions in the common phase configuration.

36. The switched capacitor array circuit of claim 35 wherein the first, second and third capacitors are in the M bank of capacitor positions in the gain phase configuration.

37. The switched capacitor array circuit of claim 36 wherein the first and second capacitors each include first terminals which are facing the output node in the common phase configuration and the third capacitor includes a first terminal facing the input node in the common phase configuration and wherein the first terminals of the first and second capacitors are facing the input node in the gain phase configuration and wherein the first terminal of the third capacitor is facing the output node in the gain phase configuration.

38. The switched capacitor array circuit of claim 35 wherein the first, second and third capacitors are in the N bank of capacitor positions in the gain phase configuration.

39. The switched capacitor array circuit of claim 38 wherein the first and second capacitors each include first terminals which are facing the output node in the common phase configuration and the third capacitor includes a first terminal facing the input node in the common phase configuration and wherein the first terminals of the first and second capacitors are facing the third node in the gain phase configuration and wherein the first terminal of the third capacitor is facing the output node in the gain phase configuration.

40. The switched capacitor array circuit of claim 1 wherein the control circuitry operates such that the first and second capacitors are disposed in the parallel position of the M bank of capacitor positions and the third capacitor is disposed in N bank of capacitor positions in the common phase configuration.

41. The switched capacitor array circuit of claim 40 wherein the first, second and third capacitors are in the M bank of capacitor positions in the gain phase configuration.

42. The switched capacitor array circuit of claim 40 wherein the first and second capacitors each include first terminals which are facing the input node in the common phase configuration and the third capacitor includes a first terminal facing the output node in the common phase configuration and wherein the first terminals of the first and second capacitors are facing the output node in the gain phase configuration and wherein the first terminal of the third capacitor is facing the input node in the gain phase configuration.

43. The switched capacitor array circuit of claim 40 wherein the first, second and third capacitors are in the N bank of capacitor positions in the gain phase configuration.

44. The switched capacitor array circuit of claim 43 wherein the first and second capacitors each include first terminals which are facing the input node in the common phase configuration and the third capacitor includes a first terminal facing the output node in the common phase configuration and wherein the first terminals of the first and second capacitors are facing the output node in the gain phase configuration and wherein the first terminal of the third capacitor is facing the third node in the gain phase configuration.

45. The switched capacitor array circuit of claim 1 wherein the control circuitry operates such that the first and second capacitors are disposed in the series position of the N bank of capacitor positions and the third capacitor is disposed in M bank of capacitor positions in the common phase configuration.

46. The switched capacitor array circuit of claim 45 wherein the first, second and third capacitors are in the M bank of capacitor positions in the gain phase configuration.

47. The switched capacitor array circuit of claim 46 wherein the first and second capacitors each include first terminals which are facing the output node in the common phase configuration and the third capacitor includes a first terminal facing the input node in the common phase configuration and wherein the first terminals of the first and second capacitors are facing the input node in the gain phase configuration and wherein the first terminal of the third capacitor is facing the output node in the gain phase configuration.

48. The switched capacitor array circuit of claim 45 wherein the first, second and third capacitors are in the N bank of capacitor positions in the gain phase configuration.

49. The switched capacitor array circuit of claim 48 wherein the first and second capacitors each include first terminals which are facing the output node in the common phase configuration and the third capacitor includes a first terminal facing the input node in the common phase configuration and wherein the first terminals of the first and second capacitors are facing the third node in the gain phase configuration and wherein the first terminal of the third capacitor is facing the output node in the gain phase configuration.

50. The switched capacitor array circuit of claim 1 wherein the control circuitry operates such that the first and second capacitors are disposed in the parallel position of the L bank of capacitor positions and the third capacitor is disposed in M bank of capacitor positions in the common phase configuration.

51. The switched capacitor array circuit of claim 50 wherein the first, second and third capacitors are in the M bank of capacitor positions in the gain phase configuration.

52. The switched capacitor array circuit of claim 51 wherein the first and second capacitors each include first terminals which are facing the input node in the common phase configuration and the third capacitor includes a first terminal facing the input node in the common phase configuration and wherein the first terminals of the first and second capacitors are facing the output node in the gain phase configuration and wherein the first terminal of the third capacitor is facing the output node in the gain phase configuration.

53. The switched capacitor array circuit of claim 1 wherein the control circuitry operates such that the first and second capacitors are disposed in the series position of the M bank of capacitor positions and the third capacitor is disposed in the L bank of capacitor positions in the common phase configuration.

54. The switched capacitor array circuit of claim 53 wherein the first, second and third capacitors are in the M bank of capacitor positions in the gain phase configuration.

55. The switched capacitor array circuit of claim 54 wherein the first and second capacitors each include first terminals which are facing the input node in the common phase configuration and the third capacitor includes a first terminal facing the input node in the common phase configuration and wherein the first terminals of the first and second capacitors are facing the output node in the gain phase configuration and wherein the first terminal of the third capacitor is facing the output node in the gain phase configuration.

56. A switched capacitor array circuit coupled between an input node and an output node and capable of providing multiple gain state values, said array circuit including:
   an L bank of capacitor positions disposed intermediate the input node and a third node, with the L bank of capacitors including series capacitor positions and parallel capacitor positions;
   an M bank of capacitor positions disposed intermediate the input node and the output node, with the M bank capacitor bank positions including series capacitor positions and parallel capacitor positions;
   an N bank of capacitor positions disposed intermediate the output node and the third node, with the N bank capacitor bank positions including series capacitor positions and parallel capacitor positions;
   first and second capacitors;
   switching circuitry coupled to the capacitors and to the input node, the output node and third node; and
   control circuitry coupled to the switching circuitry and configured to switch the switched capacitor array circuit between a common phase configuration and a first gain phase configuration so as to provide a first gain state value and between the common phase configuration and a second gain phase configuration so as to provide a second gain state value different from the first gain state value, wherein in the common phase configuration, the first capacitor is disposed in one of the L, M and N bank of capacitor positions and the second capacitor is disposed in a different one of the L, M and N bank of capacitor positions and wherein in each of the first and second gain phase configurations, the first and second capacitors are in a common one of the L, M and N banks of capacitor positions.

57. The switched capacitor array circuit of claim 56 wherein the first and second capacitors are connected in series with one another in the common one of the L, M and N banks of capacitor positions in the first gain phase configuration.

58. The switched capacitor array circuit of claim 56 wherein the first and second capacitors are connected in series with one another in the common one of the L, M and N banks of capacitor positions in the first gain and second gain phase configurations.

59. The switched capacitor array circuit of claim 57 further including a third capacitor which is connected in parallel with the first capacitor in the common phase configuration.

60. The switched capacitor array circuit of claim 59 wherein the first, second and third capacitors are connected in series in the first gain phase configuration.

61. The switched capacitor array circuit of claim 57 further including a third capacitor which is connected in series with the first capacitor in the common phase configuration.

62. The switched capacitor array circuit of claim 61 wherein the first and third capacitors are connected in parallel with one another and the second capacitor is connected in series with the first and third capacitors in the first gain phase configuration.

63. The switched capacitor array circuit of claim 57 further including a third capacitor connected in parallel with the first capacitor in the M block of capacitor positions in the common phase configuration.

64. The switched capacitor array circuit of claim 63 wherein the first, second and third capacitors are connected in series in the M block of capacitor positions in the first gain phase configuration.

65. The switched capacitor array circuit of claim 63 wherein the first, second and third capacitors are connected in series in the N block of capacitor positions in the first gain phase configuration.

66. The switched capacitor array circuit of claim 57 further including a third capacitor connected in series with the first capacitor in the M block of capacitor positions in the common phase configuration.

67. The switched capacitor array circuit of claim 66 wherein the first and third capacitors are connected parallel and the second capacitor is connected in series with the first and third capacitor in the M block of capacitor positions in the first gain phase configuration.

68. The switched capacitor array circuit of claim 57 further including a third capacitor connected in parallel with the first capacitor in the N block of capacitor positions in the common phase configuration.

69. The switched capacitor array circuit of claim 68 wherein the first, second and third capacitors are connected in series in the N block of capacitor positions in the first gain phase configuration.

70. The switched capacitor array circuit of claim 68 wherein the first, second and third capacitors are connected in series in the M block of capacitor positions in the first gain phase configuration.

71. The switched capacitor array circuit of claim 57 further including a third capacitor connected in series with the first capacitor in the N block of capacitor positions in the common phase configuration.

72. The switched capacitor array circuit of claim 71 wherein the first and third capacitors are connected parallel and the second capacitor is connected in series with the first and third capacitor in the N block of capacitor positions in the first gain phase configuration.

73. The switched capacitor array circuit of claim 71 wherein the first and third capacitors are connected parallel and the second capacitor is connected in series with the first and third capacitor in the M block of capacitor positions in the first gain phase configuration.

74. The switched capacitor array circuit of claim 57 further including a third capacitor connected in series with the first capacitor in the L block of capacitor positions in the common phase configuration.

75. The switched capacitor array circuit of claim 74 wherein the first and third capacitors are connected parallel and the second capacitor is connected in series with the first and third capacitor in the M block of capacitor positions in the first gain phase configuration.

76. The switched capacitor array circuit of claim 57 further including a third capacitor connected in parallel with the first capacitor in the L block of capacitor positions in the common phase configuration.

77. The switched capacitor array circuit of claim 76 wherein the first, second and third capacitors are connected in series in the M block of capacitor positions in the first gain phase configuration.

78. A method of controlling a switched capacitor array circuit which includes first and second capacitors, an M bank of capacitor positions disposed intermediate an input node and an output node, an L bank of capacitor positions disposed intermediate the input node and a third node and an N bank of capacitor positions disposed intermediate the output node and the third node, said method comprising:

switching the array circuit to a common phase configuration where the first capacitor is in one of the L, M and N banks of capacitor positions and the second capacitor is in another one of the L, M and N bank of capacitor positions;

switching the array circuit from the common phase configuration to a first gain phase configuration where the first and second capacitors are disposed in a common one of the L, M and N bank of capacitor positions so as to produce a first gain state value;

switching the array circuit from the first gain phase configuration to the common phase configuration;

switching the array circuit from the common phase configuration to a second gain phase configuration where the first and second capacitors are disposed in a common one of the L, M and N bank of capacitor positions so as to produce a second gain state value different from the first gain state value; and switching the array from the second gain phase configuration to the common phase configuration.

79. The method of claim 78 wherein the switched capacitor array circuit further includes a third capacitor which is connected in series with the first capacitor in the common phase configuration and is connected in parallel with the first capacitor in the first gain phase configuration.

80. The method of claim 78 wherein the switched capacitor array circuit further includes a third capacitor which is connected in parallel with the first capacitor in the common phase configuration and is connected in series with the first capacitor in the first gain phase configuration.

81. The method of claim 78 wherein the common one of the L, M and N bank of capacitor position in the first gain phase configuration and the common one of the L, M and N bank of capacitor positions in the second gain phase configuration are a same common one.

82. A method of controlling a switched capacitor array circuit which includes first, second and third capacitors, an M bank of capacitor positions disposed intermediate an input node and an output node, an L bank of capacitor positions disposed intermediate the input node and a third node and an N bank of capacitor positions disposed intermediate the output node and the third node, said method comprising:

switching the array circuit to a common phase configuration where the first and second capacitors are in one of the L, M and N banks of capacitor positions and the third capacitor is in another one of the L, M and N bank of capacitor positions;

switching the array circuit from the common phase configuration to a first gain phase configuration where the first and second capacitors are disposed in a common one of the L, M and N bank of capacitor positions so as to produce a first gain state value; and switching the array circuit from the first gain phase configuration to the common phase configuration.

83. The method of claim 82 wherein the first, second and third capacitors are disposed in a common one of the L, M and N bank of capacitor positions in the first gain phase configuration.

84. The method of claim 82 wherein the first and second capacitors are connected in parallel with one another in the common phase configuration and are connected in series with one another in the first gain phase configuration.

85. The method of claim 84 further including switching the array circuit from the common phase configuration to a second gain phase configuration so as to produce a second gain state value different than the first gain state value.

86. The method of claim 85 wherein first and second capacitors are switched to a same common one of the L, M and N banks of capacitors in the first and second gain phase configurations.

87. The method of claim 82 wherein the first and second capacitors are connected in series with one another in the common phase configuration and are connected in parallel with one another in the first gain phase configuration.

88. The method of claim 87 further including switching the array circuit from the common phase configuration to a second gain phase configuration so as to produce a second gain state value different than the first gain state value.

89. The method of claim 88 wherein first and second capacitors are switched to a same common one of the L, M and N banks of capacitors in the first and second gain phase configurations.

90. A switched capacitor array circuit coupled between an input node and an output node, said array circuit including:

an L bank of capacitor positions disposed intermediate the input node and a third node including series capacitor positions and parallel capacitor positions;

an M bank of capacitor positions disposed intermediate the input node and the output node, with the M bank capacitor bank positions including series capacitor positions and parallel capacitor positions;

an N bank of capacitor positions disposed intermediate the output node and the third node, with the N bank capacitor bank positions including series capacitor positions and parallel capacitor positions;

first and second capacitors;

switching circuitry coupled to the capacitors and to the input node, the output node and third node; and control circuitry coupled to the switching circuitry and configured to switch the switched capacitor array circuit between a common phase configuration and a first gain phase configuration so as to provide a first gain state value, wherein in the common phase configuration, the first capacitor is disposed in one of the L, M and N bank of capacitor positions and the second capacitor is disposed in a different one of the L, M and N bank of capacitor positions and wherein in the first gain phase configuration, the first and second capacitors are connected in series with one another in a common one of the L, M and N banks of capacitor positions.

91. The switched capacitor array circuit of claim 90 wherein the first and second capacitors are disposed in the M bank of capacitor positions in the first gain phase configuration and the output node is a first output node and a node intermediate the first and second capacitors in the first gain phase configuration functions as a second output node and wherein the switched capacitor array circuit further includes first and second hold capacitors connected between the first and second output nodes, respectively, and the third node.

92. The switched capacitor array circuit of claim 90 wherein the first capacitor is disposed in the M bank of capacitor positions and the second capacitor is disposed in the N bank of capacitor positions in the common phase configuration.

93. The switched capacitor array circuit of claim 92 wherein the first and second capacitors are disposed in the M bank of capacitor positions in the first gain phase configuration.

94. The switched capacitor array circuit of claim 92 wherein the first and second capacitors are disposed in the N bank of capacitor positions in the first gain phase configuration.

95. The switched capacitor array circuit of claim 92 wherein the first and second capacitors are disposed in the M bank of capacitor positions in the first gain phase configuration and wherein the control circuitry is further configured to switch the switched capacitor array circuit between the common phase configuration and a second gain phase configuration with the first and second capacitor being connected in series with one another in the N bank of capacitor positions.

96. The switched capacitor array circuit of claim 90 wherein the first capacitor is disposed in the M bank of capacitor positions and the second capacitor is disposed in the L bank of capacitor positions in the common phase configuration.

97. The switched capacitor array circuit of claim 96 wherein the first and second capacitors are disposed in the M bank of capacitor positions in the first gain phase configuration.

98. The switched capacitor array circuit of claim 97 wherein the output node is a first output node and a node intermediate the first and second capacitors in the first gain phase configuration functions as a second output node and wherein the switched capacitor array circuit further includes first and second hold capacitors connected between the first and second output nodes, respectively, and the third node.

* * * * *

UNITED STATES PATENT AND TRADEMARK OFFICE
CERTIFICATE OF CORRECTION

| | |
|---|---|
| PATENT NO. | : 6,753,623 B2 |
| APPLICATION NO. | : 09/730104 |
| DATED | : June 22, 2004 |
| INVENTOR(S) | : McIntyre et al. |

It is certified that error appears in the above-identified patent and that said Letters Patent is hereby corrected as shown below:

Column 10,
Table 1, line 15, "1/5" should be -- 1/5 --.
Table 1, line 16, "2/5" should be -- 2/5 --.
Table 1, line 17, "3/5" should be -- 3/5 --.
Table 1, line 18, "4/5" should be -- 4/5 --.
Table 1, line 19, "1" should be -- 1 --.

Column 11,
Table 3, line 59, "1/5" should be -- 1/5 --.
Table 3, line 60, "2/5" should be -- 2/5 --.
Table 3, line 61, "3/5" should be -- 3/5 --.
Table 3, line 62, "4/5" should be -- 4/5 --.

Column 12,
Table 4, line 39, "5/4" should be -- 5/4 --.
Table 4, line 40, "7/6" should be -- 7/6 --.
Table 4, line 41, "7/6" should be -- 7/6 --.
Table 4, line 42, "5/4" should be -- 5/4 --.

Column 13,
Table 6, line 43, "3/4" should be -- 3/4 --.
Table 6, line 44, "5/6" should be -- 5/6 --.
Table 6, line 45, "5/6" should be -- 5/6 --.
Table 6, line 46, "3/4" should be -- 3/4 --.
Table 7, line 61, "7/6" should be -- 7/6 --.
Table 7, line 62, "5/6" should be -- 5/6 --.

Column 14,
Table 8, line 31, "2/5" should be -- 2/5 --.
Table 8, line 32, "3/7" should be -- 3/7 --.
Table 8, line 33, "4/7" should be -- 4/7 --.
Table 8, line 34, "1" should be -- 1 --.
Table 9, line 43, "1/5" should be -- 1/5 --.
Table 9, line 44, "1/7" should be -- 1/7 --.
Table 9, line 45, "1/7" should be -- 1/7 --.
Table 9, line 46, "1/5" should be -- 1/5 --.
Table 10, line 61, "3/7" should be -- 3/7 --.
Table 10, line 62, "1/7" should be -- 1/7 --.

UNITED STATES PATENT AND TRADEMARK OFFICE
CERTIFICATE OF CORRECTION

| | | |
|---|---|---|
| PATENT NO. | : 6,753,623 B2 | |
| APPLICATION NO. | : 09/730104 | |
| DATED | : June 22, 2004 | |
| INVENTOR(S) | : McIntyre et al. | |

It is certified that error appears in the above-identified patent and that said Letters Patent is hereby corrected as shown below:

Column 15,
Table 11, line 22, "4/5" should be -- 4/5 --.
Table 11, line 23, "6/7" should be -- 6/7 --.
Table 11, line 24, "6/7" should be -- 6/7 --.
Table 11, line 25, "4/5" should be -- 4/5 --.
Table 12, line 42, "1/7" should be -- 1/7 --.
Table 12, line 43, "4/7" should be -- 4/7 --.
Table 12, line 44, "3/5" should be -- 3/5 --.

Column 16,
Table 15, line 46, "1" should be -- 1 --.
Table 15, line 47, "7/4" should be -- 7/4 --.
Table 15, line 48, "7/3" should be -- 7/3 --.
Table 15, line 49, "5/2" should be -- 5/2 --.

Signed and Sealed this

Eighteenth Day of July, 2006

JON W. DUDAS
*Director of the United States Patent and Trademark Office*